(12) United States Patent
Gane et al.

(10) Patent No.: US 8,808,855 B2
(45) Date of Patent: Aug. 19, 2014

(54) COMPOSITES OF INORGANIC MICROPARTICLES HAVING A PHOSPHATED SURFACE AND ALKALINE EARTH CARBONATE NANOPARTICLES

(75) Inventors: Patrick A. C. Gane, Rothrist (CH); Matthias Buri, Rothrist (CH); René Vinzenz Blum, St. Urban (CH); Catherine Jean Ridgway, Mühlethal (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 13/472,989

(22) Filed: May 16, 2012

(65) Prior Publication Data
US 2012/0252933 A1    Oct. 4, 2012

Related U.S. Application Data

(62) Division of application No. 12/735,081, filed as application No. PCT/EP2008/067336 on Dec. 11, 2008, now Pat. No. 8,685,532.

(60) Provisional application No. 61/008,207, filed on Dec. 19, 2007.

(30) Foreign Application Priority Data

Dec. 12, 2007    (DE) .................. 10 2007 059 681

(51) Int. Cl.
*C09C 3/06*    (2006.01)
*C09C 3/10*    (2006.01)
(Continued)

(52) U.S. Cl.
CPC . *C09C 1/02* (2013.01); *C09C 3/006* (2013.01); *C01P 2006/14* (2013.01); *D21H 27/001* (2013.01); *C01P 2006/12* (2013.01); *C01P 2004/61* (2013.01); *D21H 19/36* (2013.01); *D21H 19/385* (2013.01)
USPC .......................... 428/407; 428/403; 523/457

(58) Field of Classification Search
None
See application file for complete search history.

(56) References Cited

U.S. PATENT DOCUMENTS 4,162,348 A * 7/1979 Juzu et al. ................. 428/416
5,169,441 A * 12/1992 Lauzon ....................... 106/416
(Continued)

FOREIGN PATENT DOCUMENTS

DE    3312778 A1    11/1983
DE    4018162 A1    12/1990
(Continued)

OTHER PUBLICATIONS

The International Search Report, dated Mar. 13, 2009 for PCT Application No. PCT/EP2008/067336.

*Primary Examiner* — Monique Jackson
(74) *Attorney, Agent, or Firm* — Amster, Rothstein & Ebenstein LLP

(57) ABSTRACT

The present invention relates to composites comprising inorganic micro pigments and/or fillers in the form of surface-phosphated microparticles, whose surface is at least partially coated with finely divided with alkaline earth carbonate nanoparticles by means of binders based on copolymers comprising as the monomers one or more dicarboxylic acids and one or more monomers from the group of diamines, triamines, dialkanolamines or trialkanolamines and epichlorohydrin, a method for producing such composites, aqueous slurries thereof and the use thereof in papermaking or in the field of production of paints and plastics as well as the use of the binders for the coating of microparticles with nano alkaline earth carbonate.

9 Claims, 11 Drawing Sheets

(51) Int. Cl.
*C08K 3/26* (2006.01)
*C09C 3/00* (2006.01)
*C09C 1/02* (2006.01)
*D21H 27/00* (2006.01)
*D21H 19/36* (2006.01)
*D21H 19/38* (2006.01)

(56) References Cited

U.S. PATENT DOCUMENTS

| | | | |
|---|---|---|---|
| 5,344,487 A | 9/1994 | Whalen-Shaw | |
| 5,449,402 A | 9/1995 | Whalen-Shaw | |
| 5,454,864 A | 10/1995 | Whalen-Shaw | |
| 6,143,064 A | 11/2000 | Virtanen | |
| 6,482,881 B1 | 11/2002 | Shibata et al. | |
| 6,666,953 B1* | 12/2003 | Gane et al. | 162/181.2 |
| 8,329,289 B2* | 12/2012 | Buri et al. | 428/323 |
| 2008/0022901 A1 | 1/2008 | Buri et al. | |
| 2009/0162638 A1 | 6/2009 | Buri et al. | |
| 2009/0169894 A1 | 7/2009 | Buri et al. | |

FOREIGN PATENT DOCUMENTS

| | | |
|---|---|---|
| DE | 102006026965 A1 | 12/2007 |
| DE | 102007004124 A1 | 8/2008 |
| EP | 0406662 A1 | 1/1991 |
| EP | 0573150 A2 | 5/1993 |
| EP | 0838430 A1 | 4/1998 |
| EP | 0838494 A1 | 4/1998 |
| EP | 0950686 A1 | 10/1999 |
| EP | 1072650 A1 | 1/2000 |
| EP | 1201708 A1 | 5/2002 |
| JP | 2004244461 A * | 9/2004 |
| WO | 9208755 | 5/1992 |
| WO | 9632448 A1 | 10/1996 |
| WO | 9732934 | 9/1997 |
| WO | 0039222 A1 | 7/2000 |
| WO | 2004083316 A1 | 9/2004 |
| WO | 2005121257 A2 | 12/2005 |
| WO | 2006123235 A1 | 11/2006 |
| WO | 2007141260 A1 | 12/2007 |
| WO | 2007141271 A1 | 12/2007 |

* cited by examiner

COMPOSITES OF INORGANIC MICROPARTICLES HAVING A PHOSPHATED SURFACE AND ALKALINE EARTH CARBONATE NANOPARTICLES

CROSS-REFERENCE TO RELATED APPLICATIONS

This is a divisional of U.S. Application No. 12/735,081, filed Aug. 5, 2010, now U.S. Pat. No. 8,685,532 which is the U.S national phase of PCT Application No. PCT/EP2008/067336, filed Dec. 11, 2008, which claims the benefit of German Application No. 10 2007 059 681.4, filed Dec. 12, 2007 and U.S. Provisional Application No. 61/008,207, filed Dec. 19, 2007, which are hereby incorporated by reference in their entirety.

The present invention relates to composites, comprising inorganic micro pigments or fillers having a phosphated surface in the form of microparticles, whose surface is at least partially coated with finely divided alkaline earth carbonate particles in the nanometer range by means of binders, a method for producing such composites, aqueous slurries thereof and use thereof in papermaking and/or paper finishing or in the field of production of paints and plastics as well as the use of the inventive binders for coating of the microparticles with nano alkaline earth carbonate.

Pigments and/or fillers based on calcium carbonate particles in the nanometer range (so-called "nanoparticles") are known and are used in numerous applications including paper, paint and plastics applications. Inorganic pigments and fillers in the micrometer range (so-called "microparticles") such as inorganic mineral particles, e.g., calcium carbonate, dolomite, kaolin, talc or mica-based pigments and fillers are also known and are used in the same or similar applications.

Likewise, phosphated pigment and/or filler particles based on natural calcium carbonate are known, which are advantageous in particular due to their low weight in comparison with the corresponding unphosphated carbonate particles. As fillers and/or coating pigments in papermaking, they yield, e.g., a larger page volume at the same weight. In addition, they are softer than the corresponding unphosphated particles and may therefore be pressed flat, e.g., in calendering, which leads to an increased surface gloss of the paper. This is extremely important with coated paper such as gravure and offset paper as well as uncoated paper, e.g., supercalendered (SC) paper.

EP 0 838 430 A1, EP 0 838 494 A1, EP 0 950 686 A1 and U.S. Pat. No. 6,482,881, for example, describe fine particles which either consist completely of petaloid porous hydroxyapatite or of calcium carbonate and are surface-coated with petaloid hydroxyapatite, as well as their production and use as additives in synthetic resins or as inorganic dispersants and/or stabilizers in polymers.

Furthermore, EP 1 201 708 A1 and U.S. Pat. No. 6,482,881 describe composites of petaloid porous hydroxyapatite particles onto the surface of which a calcium phosphate component is coated.

However, such petaloid systems often have disadvantages due to their porous structure. They are often only metastable and disintegrate easily, which leads to a change in opacity, gloss and whiteness. In addition, the absorption volume for additives and auxiliary agents, e.g., solvents, such as those used in printing, for example, is very high.

EP 1 149 136 A1 and EP 1 603 977 A1 also describe surface-modified calcium carbonates, wherein the surface is altered under the influence of carbon dioxide and acids, e.g., phosphoric acid. The disadvantage of these structures is their high absorption capacity and therefore the absorption of additives is too high.

In such cases in which essentially advantageous pigments and/or fillers have certain negative properties in some applications, one approach to overcome these disadvantages in the state of the art has been to use mixtures of pigments and/or fillers to control these properties.

For example, mixtures of nanoparticles and microparticles of identical or different chemical compositions have been used in applications in paper and plastics because they have certain different properties, the combination of which is advantageous to impart the desired properties to the end product, e.g., paper.

Mixtures of such substances are used, e.g., as pigments or as fillers in papermaking but also in particular in paper finishing, such as coating, e.g., to improve the paper quality with regard to the opacity, whiteness and gloss of the paper or to improve the printability properties. It is known that the properties of such microparticles and nanoparticles can be combined advantageously with regard to retention in papermaking and in the coating "holdout" in paper finishing, e.g., paper coating. Coating "holdout" is understood by those skilled in the art to refer to whether the coating remains on the paper surface in the coating operation or whether it penetrates partially to completely into the paper surface or whether part, e.g., the binder and/or an pigment or a partial fraction of a pigment is "segregated" from the whole and penetrates into the paper surface.

When using mixtures of such microparticles and nanoparticles in applications of this type, there is unfortunately often an unwanted separation of components, so-called segregation, and associated with that, for example, there is an irregular distribution of the coating in the Z axis and thus irregular printing on the paper. The term "segregation" refers to the process of separation of different elements in an area of observation with a tendency toward a spatial distribution of the elements according to certain properties.

Segregation of pigment and/or filler mixtures, e.g., results in a different pore volume in the coating in finishing the paper by coating because the free nanoparticles become segregated from the microparticles and thereby alter the pores of the paper and/or the coating, which is important in particular when the coating should absorb a certain volume of liquid from the printing ink in the subsequent printing.

A number of such mixtures, their production and use are known in the state of the art.

A widely used technique for producing such pigment or filler mixtures is described in German Patent Application Publication DE 33 12 778 A1, for example, and consists of mixing and joint milling of a mineral filler such as natural calcium carbonate with a mineral filler such as talc.

However, under the conditions of papermaking, such mixtures are usually subject to segregation because the bonds between the components of the mixture are often unable to withstand these conditions.

Therefore, further methods have been developed for manufacturing such composites which are based on cross-linking between the pigment particles, wherein additional internal cavities are formed which should improve the optical properties of the pigment fillers.

WO 92/08755 describes a method for forming chemically aggregated porous pigment composites, in which an aqueous slurry of mineral particles, e.g., calcium carbonate is prepared and a polymer or copolymer containing carboxylic acid groups is added to this slurry to flocculate it. Calcium ions are added in excess to the slurry to precipitate the calcium salt of the polymer on the mineral flocs and thus produce aggregates of the mineral particles which are bonded by the calcium salt of the polymers and have a porous flaky structure. The excess calcium ions are reacted with carbon dioxide and precipitated as calcium carbonate on the polymer calcium salt. However, since the calcium ions are added in the form of alkaline chemical compounds, e.g., calcium hydroxide, alkaline intermediates are formed and may have a negative effect, e.g., when using certain dispersants. In addition, further precipitation of calcium carbonate alters the structure of the original nano/microparticle structure and leads to the obligatory incorporation of another pigment, namely the precipitated calcium carbonate formed by neutralization. Flocculated aggregates may in general cause problems in paper applications because they cause diffuse scattering of light on the surface, which leads to a loss of gloss of the paper. In addition, the pore volume of the composite that was originally to be achieved is influenced and altered by the flocculation on the one hand and by the PCC thus formed on the other hand.

U.S. Pat. No. 5,449,402 describes functionally modified pigment particles that are produced by mixing a flocculated pigment such as calcium carbonate with a regulator substance having an opposite charge from the flocculated pigment. The flocculated pigment is preferably an aqueous suspension of filter cake particles. Preferred regulator substances include water-insoluble or dispersible latex binders, water- or alkali-soluble organic and/or inorganic polymer binders and non-film-forming organic particles, which are electrostatically bound to the pigment particles when they are mixed together.

U.S. Pat. No. 5,454,864, U.S. Pat. No. 5,344,487 and EP 0 573 150 also describe pigment composites, the production of which is based on electrostatic attractive forces between the carrier particles and the coating particles. However, the use of such composites may be problematical in the respective applications because of interactions with other charged components.

Another method for improving whiteness according to WO 97/32934 consists of coating the pigment particles with other pigment particles such as finely divided particles of precipitated calcium carbonate, but without using a binder, which can lead to the problems discussed above. In addition, the internal particle consists of a very special mineralogical composition of feldspars formed by calcining calcium carbonate and kaolin.

WO 96/32448 describes a method for producing structured calcium carbonate pigments for coating paper by selectively aggregating fine and ultra fine anionically dispersed calcium carbonate particles by means of a cationic aggregation agent. The aggregation agents that are described here may contain, among others, polyDADMAC (polydiallyldimethylammonium chloride), salts of divalent and trivalent cations or polyamineamide-epichlorohydrin. The specific coating of nanoparticles of one species on microparticles of another species with a chemically different surface is not mentioned. Instead, the publication states that particles of the same species aggregate with themselves using a variety of different chemical aids, increasing the size of the resulting particles. An increase in the size of the primary particles, as described in this document, may in turn lead to an unwanted change in the original pigment properties.

Unpublished German Patent Applications DE 10 2006 026 965 and DE 10 2007 004 124 describe composites comprising inorganic and/or organic pigments and/or fillers in the form of microparticles whose surface is at least partially coated with finely divided calcium carbonate particles and/or dolomite particles in the nanometer range by means of binders, a method for producing such composites, aqueous slurries thereof and their use in papermaking or in the field of production of paints and plastics as well as the use of the binders for coating the microparticles with nano calcium carbonate and/or nano dolomite. However, these composites have the disadvantage that they are poorly compressible and therefore cannot be pressed flat to a sufficient extent in calendering, which leads to a lower surface gloss of the paper.

Thus, a number of mixtures and composites that are used to control certain properties of the pigments and/or fillers have become known in the state of the art. However, none of these documents discusses how to overcome the disadvantages of the above-mentioned phosphated carbonates, which are particularly advantageous with regard to their weight but on the other hand cause a very high solvent absorption, e.g. in the paint industry, due to the very large surface area (C. J. Ridgway, P. A. C. Gane, J. Schoelkopf: "Modified Calcium Carbonate Coatings With Rapid Absorption and Extensive Liquid Uptake Capacity," *Colloids and Surfaces A*, vol. 236, no. 1, pp. 91-102 (2004)).

Furthermore, problems occur with a number of the aforementioned composites, such as agglomeration of the individual components with themselves or with the composite among one another to form much larger particles.

The object of the present invention is thus to provide pigment and/or filler composites as well as aqueous slurries thereof, which not only have good optical properties, e.g., with regard to opacity and whiteness, good printing properties and are subject to little or no segregation under the processing conditions under which they are used, but also in particular have a low solvent absorption with an increased compressibility in calendering to produce an increased surface gloss of the paper.

Another object of the present invention is to provide a method for producing such composites, the use of the inventive composites in papermaking, production of paints or plastics and the use of specially selected binders in coating pigment and/or filler microparticles with alkaline earth carbonate nanoparticles.

The features defined in the independent claims serve to achieve these objects.

Advantageous embodiments of the present invention are derived from the dependent claims and the following description.

The object of the invention is achieved by a composite comprising inorganic pigment and/or filler microparticles having a phosphated surface coated at least partially with a composition comprising alkaline earth carbonate nanoparticles by means of a binder.

The porous surface of the platelet-like microparticles is coated with alkaline earth carbonate nanoparticles by means of the binder, which leads to, among other things, partial filling and/or coverage of the pores of the platelet-like, in particular petaloid structure, and thus to an optimization of the pore structure together with partial insulation of the interior void, i.e., a reduction in the pore volume and/or pore entrance diameter and therefore to a reduction in the liquid absorption.

The resulting composites are nevertheless very soft and can therefore be pressed very flatly, e.g., in calendering, without disintegrating, which leads to an increase in the surface gloss of the paper treated with the composite.

The binder consists of a copolymer comprising one or more dicarboxylic acids as the monomers and one or more monomers from the group of diamines, triamines, dialkanolamines or trialkanolamines and epichlorohydrin.

According to the invention, the spherical equivalent diameter of the surface-phosphated pigment and/or filler microparticles is primarily in the micrometer range, while the spherical equivalent diameter of the alkaline earth carbonate nanoparticles used for the coating is primarily in the nanometer range.

A particle in the nanometer range is defined according to the present invention as a particle having a spherical equivalent diameter of less than or equal to 200 nm.

A microparticle is defined according to the invention as a particle having a spherical equivalent diameter of about 0.3 μm to about 100 μm, in particular from about 1 μm to about 25 μm.

The so-called spherical equivalent diameter is a measure of the size of an irregularly shaped particle. It is calculated from a comparison of a property of the irregular particle with a property of a regularly shaped particle. Depending on the choice of the property used for comparison, a distinction is made between different equivalent diameters. In the present case, the equivalent diameter is considered with regard to the sedimentation properties of the particles investigated.

The sedimentation and thus the equivalent diameter of the particles and their distribution in this invention are determined by the sedimentation method, i.e., a sedimentation analysis in the gravimetric field using a Sedigraph 5100 from the company Micromeritics, USA. Those skilled in the art are familiar with this method and this device, which are used worldwide to determine the degree of fineness of fillers and pigments. The measurement is performed in an aqueous solution of 0.1 wt % $Na_4P_2O_7$. The samples were dispersed by using a high-speed stirrer and ultrasound.

The inventive binder has especially good bonding properties in combination with the surface-phosphated microparticles and the nano alkaline earth carbonate compositions. Thus a large portion of the nano alkaline earth carbonate composition used is permanently bound to the surface of the surface-phosphated microparticles, which leads to an improved structure in use of the composite and thus allows optimization of the pore volume to the particular application. The coating and/or filling of pores and/or interspaces of the petaloid structure in the microparticles with the nano alkaline earth carbonate composition thus causes a reduction in the specific surface area and/or pore volume and/or pore diameter and thus causes reduced absorption of solvents.

In a preferred embodiment, the starting materials for producing the surface-phosphated inorganic pigment and/or filler microparticles are selected from the group comprising natural ground calcium carbonate (GCC; ground calcium carbonate), natural and/or synthetic precipitated calcium carbonate (PCC; precipitated calcium carbonate), mixed carbonates such as dolomite and mixtures thereof whose surfaces are phosphated before use in the inventive composite.

The nano alkaline earth carbonate used for the coating is also preferably selected from the group comprising natural ground calcium carbonate (GCC; ground calcium carbonate), natural and/or synthetic precipitated calcium carbonate (PCC; precipitated calcium carbonate), mixed carbonates such as dolomite and mixtures thereof, but which are not surface-phosphated.

GCC is especially preferably used, in particular from marble, limestone and/or chalk, preferably containing at least 95 wt %, in particular more than 98 wt % calcium carbonate. GCC can be used as a raw material for the production of surface-phosphated pigment and/or filler microparticles as well as nanoparticles. Use as a raw material for the surface-phosphated pigment and/or filler microparticles as well as nanoparticles is especially advantageous.

If GCC and/or PCC is used as a pigment and/or filler microparticles and/or as nanoparticles, it preferably has a vateritic, calcitic or aragonitic crystal structure. When used as a raw material for the production of surface-phosphated pigment and/or filler microparticles, the calcitic crystal structure is especially advantageous.

In a preferred embodiment, the GCC and/or FCC may contain a $^{14}C$ isotope component that has a decay rate of preferably 1 to 890 decays per hour per gram, especially preferably from 10 to 450 decays per hour per gram, for use as a micro pigment to be phosphated as well as for use as nanoparticles. Such carbonates are described in WO 2006/123235, for example.

Dolomite according to the present invention is understood to be dolomite rock. Dolomite rock is a special carbonate rock consisting primarily of dolomite mineral, i.e., a calcium-magnesium carbonate mineral with the chemical composition $CaMg(CO_3)_2$ ("$CaCO_3.MgCO_3$"). Dolomite mineral contains at least 30 wt % $MgCO_3$, preferably more than 35 wt %, more than 40 wt % $MgCO_3$, ideally 45 to 46 wt % $MgCO_3$.

Dolomite rock is harder and more brittle than limestone, which mainly consists of calcium carbonate, $CaCO_3$, and has a higher density. It is differentiated from the latter in particular by the fact that dolomite hardly reacts at all when treated with cold acid, whereas limestone effervesces and dissolves (forming $CO_2$).

With the nano dolomite which is used for the coating according to the present invention, the use of ground natural dolomite rock containing at least 50 wt % dolomite mineral, preferably more than 75 wt % dolomite mineral, more preferably more than 90 wt % and especially preferably more than 98 wt % dolomite mineral, is especially preferred.

Especially suitable dolomites according to the present invention include those found in Europe, e.g., Norway or South America, for example. Dolomite from Southwest Norway from the region around Bergen is especially preferred.

The surface of the pigment and/or filler microparticles is phosphated before the particles are used in the composites according to the present invention, i.e., they are reacted with phosphorus compounds such as phosphoric acid. The resulting modified surface of the carbonates preferably includes calcium phosphates selected from the group comprising calcium hydrogen phosphate, OCP (octacalcium phosphate), HAP (hydroxyapatite) and mixtures thereof.

Phosphating essentially produces the formation of a petaloid ductile surface structure of particles and therefore achieves a reduction in the micro pigment and/or filler weight and thus also the weight of the composite and the medium in which it is used, e.g., a paper containing the composite as a filler.

Petaloid and/or platelet-like surface structure according to the present invention means that the surface of the pigment and/or filler microparticles has a platelet-like fine structure after being phosphated. This means that a plurality of lamellae are arranged on the surface. They preferably extend essentially vertically outward from the surface, but they may also be arranged partially tangentially to the surface.

The overall impression of such particles having a platelet-like surface resembles a rose blossom, wherein the lamellae are arranged like the leaves of the flower on the surface.

Phosphating of the carbonate surface can in general take place by the reaction of the pigment containing carbonate with phosphoric acid or phosphoric acid and one or more other medium-strong to strong providers of $H_3O^+$ ions.

Phosphating according to the production methods as described in WO 00/39222 A1 and WO 2004/083316 A1, to which reference is explicitly made here as part of the description, is performed especially advantageously according to the present invention.

Accordingly, pigments and/or fillers containing carbonate are treated with a combination of one or more medium-strong to strong providers of $H_3O^+$ ions and gaseous carbon dioxide. The strong acids are preferably selected from acids having a pKa of less than or equal to 0 (at 22° C.) and are especially preferably selected from the group consisting of sulfuric acid, hydrochloric acid and mixtures thereof. The medium-strong acids are preferably selected from acids with a pKa between 0 and 2.5 (at 22° C.) and especially preferably from the group consisting of $H_2SO_3$, $HSO_4^-$, $H_3PO_4$, oxalic acid or mixtures thereof.

The essential process steps comprise:
a) treating the pigment particles and/or filler particles in the form of an aqueous slurry by adding phosphoric acid to the slurry;
b) treating the pigment and/or filler particles with gaseous carbon dioxide, which may take place as part of the acid treatment, in parallel with the acid treatment or thereafter.

In a preferred embodiment, additionally:
c) the pH is increased to higher than 6.0, preferably higher than 6.5, more preferably higher than 7.0, in particular higher than 7.5 (each measured at 20° C.) after 1 to 10 hours, preferably 1 to 5 hours after the end of steps a) and b) without the addition of a base or immediately after steps a) and b) by adding a base such as alkali hydroxides, e.g., sodium hydroxide or potassium hydroxide and/or alkaline earth hydroxides, e.g., calcium or magnesium hydroxide, preferably calcium hydroxide and/or slaked dolomite.

The solids content of the aqueous slurry of the pigment and/or filler particles may advantageously be 1 to 80 wt %, preferably 3 to 60 wt %, 5 to 50 wt %, in particular 10 to 40 wt %, e.g., 15 to 30 wt %, based on the weight of the slurry.

The treatment according to step a) is preferably performed at a temperature of 50° C. to 95° C., more preferably 60° C. to 75° C.

The gaseous carbon dioxide comes either from the reaction of the acid with the surface of the pigment and/or filler particles in step b) or from an external source or both.

Steps a) and b) may be repeated several times, wherein step b) preferably lasts for up to 10 hours, e.g., from 2 to 6 hours.

The gaseous carbon dioxide is added to the suspension in a concentration such that the volume ratio of suspension to gaseous carbon dioxide is preferably between 1:0.05 and 1:20, more preferably between 1:0.05 and 1:5. In particular the volume ratio is between 1:1 and 1:20, more preferably between 1:0.5 and 1:10 in step a) and between 1:0.05 and 1:1 in step b).

The molar ratio of phosphoric acid to carbonate contained in the pigment and/or filler particles is preferably between 0.05 and 4, more preferably between 0.1 and 2, in particular between 0.25 and 1.

Moreover, in an especially preferred embodiment, steps a) and/or b) are performed in the presence of at least one compound selected from the group comprising aluminum silicates, calcium silicates, silicates of a monovalent salt such as sodium, potassium or lithium silicates, synthetic silicon dioxides, aluminum hydroxide, sodium or potassium aluminate, magnesium oxide or mixtures thereof. These components may be added to the aqueous pigment and/or filler particle slurry before the addition of the acid and/or of the gaseous carbon dioxide or when the reaction with the acid and/or carbon dioxide has already begun.

The surface-treated pigment and/or filler microparticles may be further reacted in suspension, optionally with stabilization with one or more anionic or cationic dispersants, e.g., polyacrylic acid. However, they may also be dried and processed further in the form of granules or powder.

The resulting surface-phosphated micro pigments and/or fillers typically have a specific surface area of 5 $m^2/g$ to 200 $m^2/g$, preferably 20 $m^2/g$ to 80 $m^2/g$, and even more preferably 30 $m^2/g$ to 60 $m^2/g$, measured under nitrogen by the BET method according to ISO 9277.

The phosphated pigment and/or filler microparticles preferably have an essentially platelet-like structure, in particular a petaloid structure, i.e., resembling the leaves of a flower. Microparticles having a platelet-like surface have proven to be especially advantageous because they are very suitable for calendering due to their surface structure. Particles having a "platelet-like" surface structure are understood to be particles which have a petaloid structure on the surface, and a ratio of length to width and/or height is >1.

In a preferred embodiment, the equivalent diameter of the pigment and/or filler microparticles before phosphating is essentially in a range from about 0.3 µm to about 25 µm, preferably in a range from about 0.3 µm to about 5 µm, in particular in a range from about 0.3 µm to about 1 µm, e.g., 0.7 µm.

In a preferred embodiment, the equivalent diameter of the pigment and/or filler microparticles after phosphating is essentially in a range from about 0.3 µm to about 100 µm, preferably in a range from about 0.3 µm to about 75 µm, more preferably in a range from about 0.3 µm to about 50 µm, more preferably in a range from about 0.3 µm to about 25 µm, most preferably in a range from about 0.3 µm to about 15 µm, in particular in a range from about 0.3 µm to about 12 µm.

In an especially preferred embodiment, about 90% to 100%, preferably 92% to 99%, more preferably 94% to 98%, especially preferably 96% to 98%, e.g., 97±0.5% of the alkaline earth carbonate nanoparticles, based on the number N of the alkaline earth carbonate nanoparticles, have a spherical equivalent diameter of less than 200 nm, preferably less than 150 nm, more preferably less than 100 nm. The diameter is preferably in a range of 20 to 200 nm, 50 to 180 nm or 70 to 150 nm.

The particle size distribution was measured by the sedimentation method as described above using a Sedigraph 5100 device from the company Micromeritics, USA and printed out as a total throughput curve using an X-Y plotter, wherein the X axis denotes the particle diameter as a corresponding spherical equivalent diameter and the Y axis denotes the corresponding particle amount in percentage by weight (see, for example, P. Belger, Schweizerische Vereinigung der Lack-und Farbenchemiker, XVII FATIPEC Congress, Lugano, Sep. 23 to 28, 1984).

The percentage of the particle count N % of nanoparticles was calculated from the measurement results thereby obtained using the following method:

The values are taken from the Sedigraph curve. The difference between 0 and 0.2 µm yields the 0.1 µm value (100 nm); the difference between 0.2 and 0.4 µm yields the 0.3 µm value (300 nm), etc. The sum of the differences is standardized to 100 mg and the quantities of each range are calculated from this. In the calculation, it is assumed that the particles are spherical with a diameter d of the average of the differential range. The volume V of a particle is calculated from this:

$$V = 0.5236 \, d^3$$

and from this the weight G of a particle (divided by the specific density, e.g., for $CaCO_3$: 2.7 $g/cm^3$) is calculated:

$$G = V/2.7.$$

From the weight of the respective fraction, by division of the particle weight the number of particles can be calculated and from this the percentage distribution in N % can be calculated.

If the nano alkaline earth carbonate to be used for the coating does not already have the desired or required fineness, i.e., particle size, it may be ground in one or more wet or dry grinding steps, preferably multiple steps, e.g., one or two dry and/or wet steps, preferably aqueous milling steps to yield the corresponding particle diameter.

The milling may be performed in any of the milling equipment with which those skilled in the art are familiar for milling alkaline earth carbonates. The usual ball mills, jet disk mills are especially suitable for dry milling; combinations of those mills or combinations of one or more such mills with cyclones and classifiers are also very suitable. For wet milling, conventional attritor mills such as those distributed by the company Dynomill, for example, are suitable.

In the case of dry milling, preferably ball mills are used and preferably iron balls and/or porcelain balls with a diameter of 0.5-10 cm, especially preferably iron cylpebs with a diameter of 2.5 cm are used as the milling bodies. In wet milling, milling balls comprising, for example, zirconium silicate, zirconium dioxide and/or baddeleyite with a size of 0.2-5 mm, preferably 0.2-2 mm but also 0.5-5 mm, e.g., with a diameter of 0.5-2 mm are preferred. However, quartz sand with a diameter of 0.1-2 mm may also be used.

The alkaline earth carbonate particles in the nanometer range are preferably produced and/or brought to the desired equivalent diameter by wet milling, in particular when it is natural alkaline earth carbonate.

Both dry and wet milling steps may be performed in succession, wherein the last milling step is preferably wet milling.

The alkaline earth carbonate may be dispersed and/or milled, e.g., in the form of an aqueous slurry in the presence of one or more milling aids and/or dispersants, preferably with a solids content of the alkaline earth carbonate of more than 10 wt %, more than 20 wt %, e.g., 15-30 wt %, preferably more than 30 wt %, more preferably more than 50 wt %, better yet more than 60 wt %, e.g., with a solids content of 65 to 68 wt %, especially preferably more than 70 wt %, e.g., with a solids content of 72-80 wt %.

Without milling aids or dispersants, the alkaline earth carbonate may preferably be dispersed and/or milled at a solids content of up to 30 wt %, e.g., 15-30 wt %. At a solids content of more than 30 wt %, it may be better to perform the dispersing and/or milling in the presence of milling aids and/or dispersants.

At concentrations of less than or equal to 30 wt %, wet milling may also be performed without chemical aids. Such products, as well as alkaline earth carbonate slurries with a low solids content of ≤60 wt %, for example, may preferably be physically concentrated, e.g., by filter pressing and/or centrifuging and/or thermally and using one or more dispersants. Combinations of mechanical and thermal concentration steps are especially preferred. The final concentration after the concentrating step is preferably greater than 60 wt % solids content, especially preferably between 65 wt % and 78 wt %, e.g., 72±2 wt %.

As the milling aids, for example, anionic milling aids and/or dispersants may be used, preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid, e.g., polysalt S from the company BASF, Ludwigshafen, are especially preferred. The molecular weight Mw of such products is preferably in the range of 2000-15000, with a molecular weight Mw of 3000-7000 being especially preferred. The molecular weight Mw of such products is also preferably in the range of 2000 to 150000 g/mol, and an Mw of 15000 to 50000 g/mol is especially preferred, e.g., 35000 to 45000 g/mol. The molecular weight of the milling aids and/or dispersants is selected so that they do not act as a binder but instead act as a parting compound. The polymers and/or copolymers may be neutralized with monovalent and/or polyvalent cations or they may have free acid groups. Suitable monovalent cations include, for example, sodium, lithium, potassium or ammonium. Suitable polyvalent cations include, for example, calcium, magnesium, strontium or aluminum. The combination of sodium and magnesium is especially preferred. Milling aids and/or dispersants such as sodium polyphosphates and/or polyaspartic acid as well as their alkali and/or alkaline earth salts, sodium citrate and amines, alkanolamines, such as triethanolamine and triisopropanolamine may also be used advantageously either alone or in combination with others.

In dry milling in particular, milling aids and/or dispersants that may be used include those selected from the group comprising glycols, polyglycols, e.g., polyethylene glycols, ethylene oxide-propylene oxide-ethylene oxide block copolymers or alkanolamines such as triethanolamine and triisopropanolamine or a mixture thereof. It is also possible to use other monomers or polymer additives such as ethylene-acrylic acid copolymers alone or in combination. The ratio of acrylic acid monomers in the copolymer with ethylene monomers is preferably 1:4 to 1:50, especially preferably 1:4 to 1:10, particularly 1:5.

The dispersants and/or milling aids may be used in an amount of about 0.01 wt % to 5 wt %, based on the total dry weight of the composite, e.g., in dry milling 0.01-0.5 wt %, preferably 0.1-0.3 wt %.

They are especially preferably present in an amount of 0.2 to 1 mg/m$^2$ nanoparticle surface area, e.g., in an amount of 0.3 to 0.7 mg/m$^2$ nanoparticle surface area.

In wet milling, the dispersants and/or milling aids are advantageously present in an amount of about 0.05-2.0 wt %, preferably in an amount of 0.3 to 1.5 wt %, e.g., 1 wt %, but also in an amount of about 0.85 to 0.95 wt %.

The milling aid and/or dispersant supports the milling of the alkaline earth carbonate particles to the nano range by reducing the viscosity of the slurry and thereby increasing the mobility and free path length of the particles to be milled and of the milling beads. This is advantageous in subsequent formation of the composite.

The viscosity of the slurry in wet milling is preferably less than 2500 mPa·s, more preferably less than 1500 mPa·s, in particular less than 1000 mPa·s, or better yet less than 500 mPa·s and especially preferably in the range of 50-250 mPa·s, measured with a conventional Brookfield viscometer, e.g., of the EV-2+ type with a disk spindle 3 at 100 rpm.

It is also possible to use other monomeric or polymeric additives such as ethylene-acrylic acid copolymers (EAA) or salts thereof, alone or in combination, during the milling and/or dispersing in addition to the milling aid and/or dispersant. The ratio of acrylic acid monomer in the copolymer with ethylene monomer is preferably 1:4 to 1:50, especially preferably 1:4 to 1:10 and in particular 1:5. EAA and/or its salts are preferred, having a melt viscosity in the unneutralized form of 3000 to 25000 mPa·s, from 15000 to 100000 mPa·s and from 50000 to 400000 mPa·s at 200° C., 170° C. and/or 140° C., preferably 3000 to 7000 mPa·s, 15000 to 20000 mPa·s and from 50000 to 100000 mPa·s at 200° C., 170° C. and/or 140° C., and in particular a melt viscosity of 15000 to 25000 mPa·s, of 50000 to 100000 mPa·s and of 300000 to 400000 mPa·s at 200° C., 170° C. and/or 140° C.

An EAA copolymer having a melt viscosity of 24,300 mPa·s at 200° C., 88,300 mPa·s at 170° C. and 367000 mPa·s at 140° C. is especially preferred.

EAA copolymers that are commercially available and are very suitable preferably have an acrylic acid content of 20 mol % and are distributed by BASF, Germany, or Dow, USA, for example.

Use of the EAA copolymers or their salts produces, among other things, partial to complete hydrophobization of the pores of the substrate, e.g., the coated paper and/or the pores of the composite itself, so that the wetting of the open pores of the paper and/or the coating and/or the composite by water is reduced, controlled and/or prevented.

If the EAA salts are used, they are neutralized partially or completely, e.g., with amines, preferably selected from the group comprising 2-amino-2-methyl-1-propanol, 3-amino-1-propanol, 2-[bis(2-hydroxyethyl)amino]ethanol and/or alkali metal ions such as potassium, lithium and/or sodium or mixtures thereof, preferably with sodium. For example, at least 70 mol % or at least 95 mol % of the carboxylic acid groups are neutralized.

EAA and the salts thereof may be used in an amount of 0.01 wt % to 10 wt %, based on the total dry weight of the composite, preferably from 0.01 wt % to 5 wt %, more preferably 0.05 wt % to 5 wt %, 0.1 wt % to 2 wt %, e.g., in an amount of 1.0 wt %.

The inventive composite preferably contains from 5 wt % to 95 wt %, more preferably 20 wt % to 80 wt %, even more preferably 25 wt % to 75 wt %, e.g., 50 wt % pigment and/or filler microparticles, based on the total dry weight of the microparticles and nanoparticles. The inventive composite preferably contains 95 wt % to 5 wt %, preferably 80 wt % to 20 wt %, more preferably 75 wt % to 25 wt %, e.g., 50 wt % alkaline earth carbonate nanoparticles, based on the total dry weight of the microparticles and nanoparticles.

The pigment and/or filler microparticles and the nano alkaline earth carbonate are advantageously used in a ratio of preferably 1:20 to 20:1, in particular in a ratio of 1:4 to 4:1, more preferably in a ratio of 1:3 to 3:1 or 1:2 to 2:1 but also in a ratio of 1:1, based on the dry weight. The weight ratio of inorganic pigment and/or filler microparticles to alkaline earth carbonate nanoparticles is most preferably 3:1 or 1:3.

The binder used in the inventive composites consists of a copolymer comprising as the monomer one or more dicarboxylic acids and one or more monomers from the group of diamines, triamines, dialkanolamines or trialkanolamines and epichlorohydrin.

Preferably saturated or unsaturated, branched or unbranched $C_2$-$C_{10}$ dicarboxylic acids, especially $C_3$-$C_9$ dicarboxylic acids, $C_4$-$C_8$ dicarboxylic acids, $C_5$-$C_7$ dicarboxylic acids, adipic acid in particular, are used as the dicarboxylic acid monomers.

Linear or branched, substituted and unsubstituted diamines and triamines, in particular N-(2-aminoethyl)-1,2-ethane-diamine, are especially suitable as the second monomer of the binder polymer. Preferred dialkanolamines and trialkanolamines include, for example, diethanolamine, N-alkyldialkanolamines, e.g., N-methyl- and N-ethyl-diethanolamine and triethanolamine.

To monitor and control the molecular weight and/or chain length, one or more monovalent amines such as monoatkanolamines may be used during the polycondensation. Monoethanolamine is preferred.

The resulting intermediate is subsequently reacted with epichlorohydrin.

In an especially preferred embodiment according to the present invention, a copolymer of adipic acid with N-(2-aminoethyl)-1,2-ethanediamine and epichlorohydrin is used as the binder.

The inventive binder may be neutral or may have a cationic charge. It preferably has a cationic charge.

Anionic polymers such as sodium polyacrylates or sodium polyvinyl sulfates may be used for charge neutralization.

For neutralization of 100 g binder, based on the solids content, for example, 10 g to 50 g sodium polyacrylate with an Mw of 25000 to 28000 g/mol, especially preferably 20 g to 40 g, ideally 25 g to 30 g, based on the solids content, are needed.

Neutralization may also be performed during the production of the composites by one of the components, e.g., by dispersants added in one of the preparation steps.

The binder serves to provide better adhesion of the nanoparticles to the surface of the microparticles and is selective inasmuch as essentially only nanoparticles are bound to the microparticles but nanoparticles and/or microparticles are not bound to themselves, forming larger unwanted aggregates.

Furthermore, by means of the binder, the microparticle pores are filled with nanoparticles. Thus, the pore volume and the pore diameter of the microparticles is reduced, and the solvent absorption is reduced but the compressibility is surprisingly not reduced significantly, which leads to good gloss values in calendering.

Based on the total dry weight of the composite, the binder is advantageously present in an amount from about 0.1 wt % to about 10 wt %, preferably about 0.5 wt % to about 5 wt %, especially preferably about 1 wt % to about 3 wt %.

The porosity, the pore volume and the pore size may be determined by means of mercury porosimetry, e.g., by means of a Micromeritics Autopore IV mercury porosimeter.

The inventive composites preferably have a mercury porosity of 25% to 75%, better yet 40% to 60%, more preferably 45% to 55%.

In an especially preferred embodiment, in particular with regard to the opacity properties, the pores of the inventive composites have an equivalent Laplace diameter of primarily 0.1 µm to 0.3 µm, especially 0.12 µm to 0.25 µm, more preferably 0.18 µm to 0.22 µm.

In another preferred embodiment, in particular with regard to printability and/or ink absorption, the pores of the inventive composites have an equivalent Laplace diameter of primarily 0.01 µm to 0.12 µm, preferably 0.02 µm to 0.1 µm, more preferably 0.03 µm to 0.08 µm.

The total intrusion volume for mercury in the mercury porosimetry measurement preferably amounts to 0.25 to 1 $cm^3$/g, more preferably 0.3 to 0.6 $cm^3$/g, most preferably 0.35 to 0.45 $cm^3$/g.

The pore volume of the surface-phosphated microparticles determined by mercury porosimetry is usually many times higher. They have a bimodal pore size distribution with pores >1 µm between the particles and smaller pores within the particles.

The inventive composites also preferably have a bimodal pore size distribution with regard to the intrusion volume and/or the mercury porosity, but with lower equivalent Laplace pore diameters of <1 µm.

It is especially preferable if there is a bimodal pore volume distribution, one maximum preferably being at diameters of 0.1 µm to 0.2 µm, e.g., in a range of 0.18 µm to 0.22 µm and thus in a range of optimal light reflection for good opacity properties and the other maximum at diameters of less than 0.1 µm, preferably in a range of 0.03 µm to 0.08 µm, which allows optimal ink uptake in printing. The volume ratio of pores in these ranges preferably amounts to 1:1 to 3:1, especially suitably for offset printing 2:1.

The liquid absorption properties of the inventive composites have been investigated by means of hexadecane, which is known for the fact that it can fill up the entire pore volume of a porous pigment structure that is accessible to saturation, according to the method described in P. A. C. Gane, J. Schoelkopf, D. C. Spielmann, G. P. Matthews, C. J. Ridgway (2000): "Fluid Transport into Porous Coating Structures: Some Novel Findings," *Tappi Journal*, 83 (5), p. 77.

Accordingly, the total absorption volume of the inventive composites for hexadecane is from 0.3 to 1.0 g/cm$^3$, preferably 0.35 to 0.45 g/cm$^3$ in an especially preferred embodiment.

The absorption curves during liquid uptake may be expressed as a linear ratio between V(t)/A and $\sqrt{t}$ with the following gradient:

$$\frac{d(V(t)/A)}{d\sqrt{t}} = \frac{d((m(t)/\rho)/A)}{d\sqrt{t}}$$

wherein m(t) is the increase in weight at time t, defined by a volume V(t) of a liquid with the density $\rho$. The data are standardized to the cross-sectional area A of the sample, so that the resulting data can be expressed as V(t)/A, the volume absorbed per unit of cross-sectional area of the sample. The gradient can be obtained directly by linear regression from the data printed out, yielding the absorption rate of the liquid uptake.

In this context, it is especially advantageous if the composites of the present invention have a long-term absorption rate $d(V/A)/d(\sqrt{t})$ for hexadecane of $7 \cdot 10^{-5}$ to $2 \cdot 10^{-4}$ ms$^{-0.5}$, better yet $9 \cdot 10^{-5}$ to $1.1 \cdot 10^{-4}$ ms$^{-0.5}$, e.g., $1 \cdot 10^{-4}$ ms$^{-0.5}$. "Long-term" according to this invention is understood to refer to a period of seconds to hours, in particular the period of time until an equilibrium is established.

With regard to the short-term absorption rate $d(V/A)/d(\sqrt{t})$ for hexadecane, the composites according to the present invention have values of $1 \cdot 10^{-3}$ to $2 \cdot 10^{-3}$ ms$^{-0.5}$, better yet $1.3 \cdot 10^{-3}$ to $1.5 \cdot 10^{-3}$ ms$^{-0.5}$, for example. "Short-term" according to this invention is understood to refer to a period of time in the range of about $10^{-3}$ seconds.

Another solution to the object of this invention is a method for producing the inventive composites in which both the pigment and/or filler microparticles, the nano alkaline earth carbonate composition and the binder are provided and mixed.

The binder is added either to the pigment and/or filler microparticles or to the nano alkaline earth carbonate composition, which are then mixed together well. It is also possible for the pigment and/or filler microparticles or the nano alkaline or carbonate composition to be first mixed together and for the binder to be added to the resulting mixture.

However, the binder may also be provided in an aqueous form, e.g., an aqueous solution or suspension, to which the pigment and/or filler microparticles are first added and then the nano alkaline earth carbonate composition is added or first the nano alkaline earth carbonate composition is added and then the pigment and/or filler microparticles are added and subsequently homogenized.

In principle, the pigment and/or filler microparticles as well as the nano alkaline earth carbonate composition may be used either dry or as an aqueous slurry. If the pigment and/or filler microparticles and the nano alkaline earth carbonate composition are used dry, however, enough water must be used to form an aqueous slurry.

The nano alkaline earth carbonate composition is usually provided in the form of an aqueous slurry, while the pigment and/or filler microparticles may be used in solid form or in the form of an aqueous slurry. The inorganic pigment and/or filler microparticles are often preferably used in solid form.

"Solid" here is not necessarily to be understood as "dry." The term "solid" should describe only the consistency of the substance used, which may readily have a substantial moisture content. For example, a mixture of 80 wt % inorganic pigment and/or filler microparticles with 20 wt % water may nevertheless have a solid consistency.

The binder is preferably provided in an aqueous form, e.g., in the form of a solution, emulsion or slurry, especially preferably as a solution.

To ensure a better dispersion, a dispersant may also be added to any of the components or mixtures, e.g., in the form of an aqueous solution and/or a powder of a dispersant, selected from the group comprising polyacrylic acid salts such as the sodium salt, sodium polyphosphate or polymaleic/acrylate copolymers.

The dispersant(s) may be added after combining the binder with the resulting reaction mixture, for example, or may be added before combining the binder with the pigment and/or filler microparticles or the nano alkaline earth carbonate composition to the component to which the binder is subsequently added or to the component which is added.

In a special embodiment, the two slurries of the pigment and/or filler microparticles and/or the nano alkaline earth carbonate composition are first mixed together. Then the binder is added to this mixture and the resulting slurry is homogenized. In homogenization, a dispersant may be added before, with or after the binder, but is preferably added before the binder.

In another embodiment, the binder is added to a slurry of the pigment and/or filler microparticles and the resulting mixture is homogenized. Then the homogenized mixture is mixed with the slurry of the nano alkaline earth carbonate composition, optionally with the addition of a dispersant.

Furthermore, polymeric cationic and/or amphoteric dispersants may also be added, e.g., polydiallyldimethyl-ammonium chloride (polyDADMAC) or copolymers of acrylic acid with cationic monomers or mixtures of such dispersants. Such products are described in DE 40 18 162, for example, and are obtainable from the company Stockhausen GmbH, Krefeld, under the brand name Prästol, for example.

These dispersants may additionally be added to the binder in an amount of 0.01 wt % to 1 wt %, based on the total dry weight of the composite, preferably in an amount of 0.1 wt % to 0.5 wt %, e.g., 0.25 wt %. They support the adsorption of the binder.

Mixing and homogenizing these slurries of the pigment and/or filler microparticles and/or the nano alkaline earth carbonate composition, including the admixing and stirring of the binder, may take place, for example, with a stirrer of the Pendraulik type with a toothed disk with a diameter of 3.5 cm as the stirrer, preferably at 5-90° C., especially preferably at room temperature at about 20-25° C.

Likewise, the mixing and homogenizing of the slurries by means of a plowshare mixer is also possible, in particular when the pigment and/or filler microparticles are first mixed with the binder. Plowshare mixers function by the principle of a fluidized bed produced mechanically. Plowshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. The equipment used is available from Gebrüder Lödige Mascbinenbau GmbH, Paderborn, Germany.

If the slurry of the nano alkaline earth carbonate composition is added only when the pigment and/or filler microparticles have already been pretreated with the binder, this may be done by means of a tubular mixing device, for example, by pumping the slurry through the tubular mixing device by means of a centrifugal pump and introducing the slurry of the pretreated pigment and/or filler microparticles continuously through an intake tube into the tubular mixing device. Such a tubular mixing device is available from Ystral GmbH, Ballrechten-Dottingen, Germany, for example.

The mixing may be performed at a room temperature of about 20-25° C. Heating during the production process, e.g., due to friction during the dispersing operation, need not necessarily be counteracted. The temperature during the process may usually be 20-90° C., preferably between 20° C. and 70° C.

A combination of various mixing systems may be used, as well.

The water content of the composite obtained according to the inventive manufacturing process may be reduced. The composites may be dried so that they are obtained as solids, but they may also be processed further as a slurry and as a renewed aqueous slurry of the dried composite so that not only the inventive composite per se but also an aqueous slurry thereof represents a solution according to the present invention.

The solids content of the composite slurry may also be increased thermally, e.g., by means of a spray drier or a microwave or in an oven, or mechanically, e.g., by filtration, lowering the water content, or the solids content may be reduced by adding water.

Further aspects of the present invention include the possible uses of the composite, whether in a solid, moist or dry state or as an aqueous slurry.

Thus, one of the main uses of the composite or its slurry is the use in papermaking or in paper finishing, e.g., in coating of paper. For example, it may be used as a filler or pigment, e.g., as a coating pigment.

In papermaking the composite is preferably used in amounts of 0.5 to 50 wt %, preferably 1 to 30 wt %, based on the total weight of the paper. In paper finishing, e.g., in coating of paper, preferred amounts of the inventive composite are from 0.5 to 100 $g/m^2$, preferably 2 to 50 $g/m^2$, especially preferably 5 to 25 $g/m^2$ per side of paper.

The composite may also be used in multi-coated systems, e.g., in the precoat and/or intermediate coat and/or topcoat or single coat. If the composite coating is a precoat and/or an intermediate coat, then another coating with conventional pigments with which those skilled in the art are familiar may be applied thereon. The composite may be used for papers coated on one or both sides, wherein one or more of the coatings on one or both sides contains the composite.

Paper which is coated on one or both sides or uncoated may be calendered paper as well as uncalendered paper.

Through a targeted selection of the composite with regard to its composition and size, the pore volume of the paper and/or the coating may furthermore be varied, e.g., increased and controlled through coverage or non-coverage by the composite particles.

The inventive composite may also be used together with other conventional pigments and/or fillers.

The present invention thus also includes fillers or pigments comprising an inventive composite or a slurry thereof.

Another aspect of the present invention in addition to the use of the inventive composite or its slurry in papermaking also includes its use in production of paints or plastics.

Likewise, the inventive composites may also be used to reduce the sheen due to their structure. "Sheen" is understood to refer to a gloss which occurs when a surface is observed at a very shallow angle and often has a very irritating effect on the observer. To reduce the sheen, very disperse scattering is necessary, which can be provided by the inventive composites.

The inventive composites may also be used in sealants, e.g., as thickeners or viscosity control agents.

Another solution according to the present invention includes the use of the inventive composite or a slurry thereof as a filtration aid either alone as a filter layer or in or on a natural and/or synthetic carrier material such as cotton, cellulose and polyamide fibers. The porous structure and low segregation of the composites yield an optimal liquid transfer with good retention for suspended matter at the same time.

Thus, a filter aid comprising an inventive composite or a slurry thereof is also one aspect of the present invention.

Another aspect of the present invention furthermore is a coating colour comprising an inventive composite.

Such a coating colour preferably has a solids content of 25-75 wt %, more preferably 30-60 wt %, especially preferably 30-40 wt %. The amount of composite, based on the total solids content of the coating colour, may be 3-97 wt % but is preferably between 10 wt % and 90 wt %, especially preferably being 85±10 wt %.

The coating colour may be applied to various substrates, e.g., paper, but also plastic films, e.g., of the type Synteape from Arjo Wiggins Teape or to cement or plaster.

It is especially preferable if coating aids are added to the coating colour, e.g., those based on acrylic acid ester/styrene copolymers such as those known by the brand names Acronal® (BASF) or based on styrene-butadiene and/or acrylonitrile copolymers, e.g., Styronal® series (BASF), copolymers of acrylonitrile, butadiene, butyl acrylate and styrene, such as the Basonal® grades (BASF). However, natural coating aids such as starches may also be used alone or in combination with the above synthetic aids.

Finally, in view of the excellent binding properties of the binders in the inventive composites, another aspect of the present invention involves the use of a polymer comprising as the monomer one or more dicarboxylic acids and one or more monomers from the group of diamines, triamines, dialkanolamines or trialkanolamines and epichlorohydrin for at least partial coating of pigment and/or filler microparticles with a composition comprising alkaline earth carbonate nanoparticles such as those described above. The use of a polymer of adipic acid with N-(2-aminoethyl)-1,2-ethanediamine and epichlorohydrin as the binder is especially preferred.

The figures, examples and experiments described below serve to illustrate the invention and should not restrict it in any way.

DESCRIPTION OF FIGURES

The figures described below are scanning electron micrographs (SEM) of various state-of-the-art mixtures and inventive composites, among others. The mixtures and the inventive composites were adjusted to a concentration of 20 wt % in water using an Ultraturrax. A few drops (about 100 mg) of each were diluted in 250 mL distilled water and filtered through a 0.2 μm pore membrane filter. The preparations obtained on the membrane filter were sputtered with gold and evaluated in the SEM.

EXAMPLES

Figure 1:
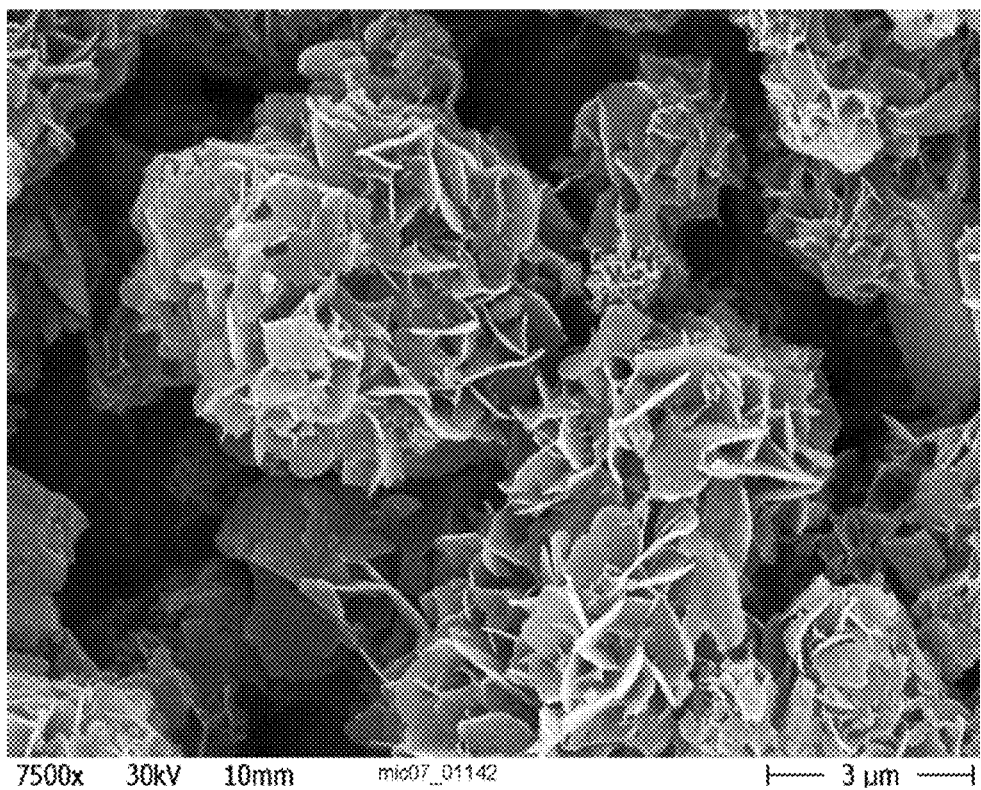
FIGS. 1 and 2 show the SEM of a surface-phosphated microparticle according to the state of the art in the uncalendered state (FIG. 1) and in the calendered state (FIG. 2), respectively.

Preparation and Description of Nanoparticles that May be Used According to the Invention The preparation of nano alkaline earth carbonate compositions suitable for the inventive composites is described below.

Nano alkaline earth carbonate composition 1 was continuously milled to yield the following size distribution by wet milling in a vertical 160 liter attritor ball mill in two passes using Norwegian marble dry pre-milled in a conventional ball mill with iron cylpebs with a diameter of 2.5 cm to an average spherical particle diameter of 45 μm, using a total of 0.85 wt % sodium/magnesium polyacrylate with an Mw of 4000-8000 g/mol, based on the total dry weight of the nano alkaline earth carbonate as dispersant/milling aid at a solids content of 72 wt %;

| Diameter (nm) | Number (N) of particles in N % | Weight % |
|---|---|---|
| <200 | 97.4 | 23.6 |
| 200-400 | 2.0 | 22.4 |
| 400-600 | 0.4 | 18.7 |
| 600-800 | 0.1 | 14 |
| 800-1000 | 0.1 | 9.3 |

The Brookfield viscosity of the slurry obtained after wet milling was 285 mPa·s. The specific surface area, measured according to BET, was 17.2 m²/g (ISO 9277). The milling beads used were made of zirconium silicate and baddeleyite and had a size of 0.5-2 mm.

Nano Alkaline Earth Carbonate Composition 2 was continuously milled to yield the following distribution by wet milling in a vertical 160-liter attritor ball mill in two passes, using Norwegian marble dry pre-milled to average spherical particle size of 45 μm, using a total of 0.45 wt % sodium magnesium polyacrylate with Mw 4000-8000 g/mol, based on the total dry weight of the ratio alkaline earth carbonate as the dispersant/milling aid at a solids content of 72 wt %:

| Diameter (nm) | Number (N) of particles in N % | Weight % |
|---|---|---|
| <200 | 96.3 | 17.8 |
| 200-400 | 2.8 | 14.2 |
| 400-600 | 0.5 | 12.6 |
| 600-800 | 0.2 | 10.7 |
| 800-1000 | 0.1 | 8.9 |

The Brookfield viscosity of the slurry obtained after wet milling was 128 mPa·s. The specific surface area, measured according to BET, was 12.6 m²/g (ISO 9277). The milling heads consisted of zirconium silicate and baddeleyite and had a size of 0.5-2 mm.

Nano Alkaline Earth Carbonate Composition 3 was milled continuously to the following size distribution by wet milling in a vertical 1.6-liter attritor ball mill (Dynomill) in circulation using 10 kg Norwegian dolomite with an average particle diameter of 5 μm, using a total of 1.2 wt % sodium polyacrylate with an Mw of 25000-28000 g/mol, based on the total dry weight of the nano dolomite as dispersant/milling aid at a solids content of 72 wt %:

| Diameter (nm) | Number (N) of particles in N % | Weight % |
|---|---|---|
| <200 | 96.9 | 18.6 |
| 200-400 | 2.4 | 12.4 |
| 400-600 | 0.4 | 10.3 |
| 600-800 | 0.1 | 9.2 |
| 800-1000 | 0.05 | 9.0 |

The Brookfield viscosity of the slurry obtained after this production was 452 mPa·s. The specific surface area, measured according to BET, was 13.8 m²/g (ISO 9277). The milling beads used were made of zirconium silicate and baddeleyite and had a size of 0.5-2 mm.

Production and Description of Microparticles that May be Used According to the Invention The following experiments were conducted using the following surface-phosphated micro pigments and/or fillers:

Surface Phosphated Microparticles 1

In a 3600-liter reactor with a toothed disk dissolver were placed first 380 kg of a 78 wt % potassium carbonate slurry of Norwegian marble with an average calcium carbonate particle diameter of about 0.75 μm, Hydrocarb 90 ME 78 wt %, a commercial product obtainable from the company OMYA GmbH, Cologne, was used in the present case. The slurry was diluted to 10 wt % solids content by adding water and heated to 70° C. After reaching 70° C., 296.4 kg of a 0.25 wt % phosphoric acid (Schweizerhalle Company, Switzerland) was added within 1.5 hours. The setting of the stirring unit was selected so that thorough mixing was ensured during the entire reaction time. The pH at the end of drop-wise addition was 6.4. The pH was adjusted to 8 by adding Ca(OH)₂. The specific surface area of the end product, measured according to BET, was 48.0 m²/g. Solids content: 9.2 wt %.

Figure 2:
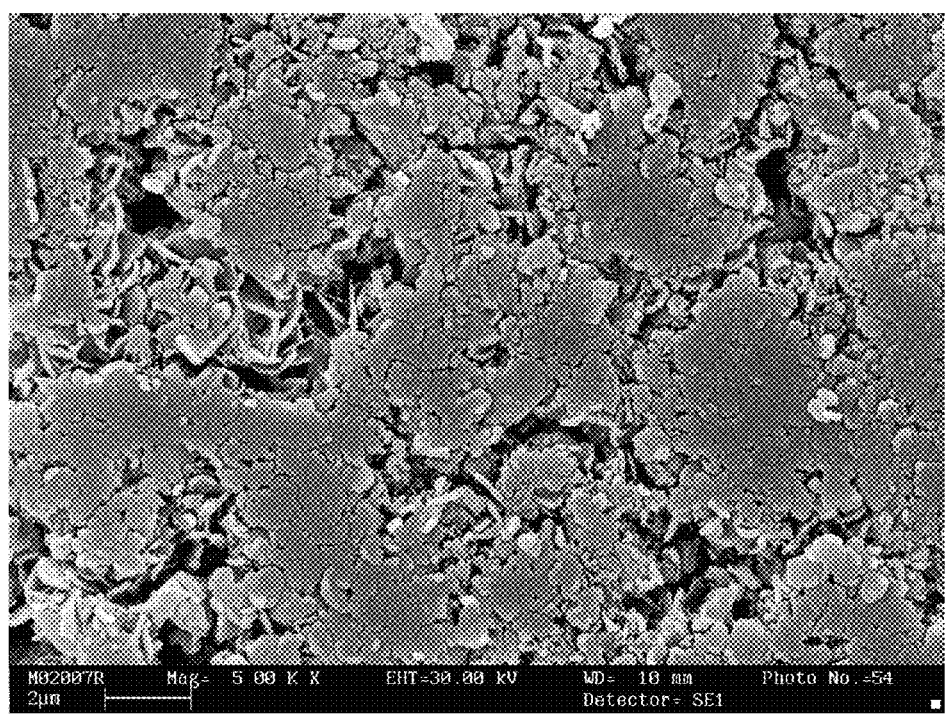

FIG. 1 shows the petaloid structure of the surface-phosphated microparticles 1. FIG. 2 shows the micro-particles 1 in a calendered state.

Surface-Phosphated Microparticles 2

In a 10-liter Esco reactor with a toothed disk dissolver and stripper, 1600 g of a 75 wt % calcium carbonate slurry of champagne chalk with an average particle diameter of the calcium carbonate of about 0.8 μm was placed first. In the present case, the commercial product Omyalite 90, 75 wt %, obtainable from OMYA S.A., Paris, was used. The slurry was diluted to a solids content of 20 wt % by adding water and heated to 70° C. After reaching 70° C., 2000 g of a 15 wt % phosphoric acid (Schweizerhalle Company, Switzerland) was added within 15 minutes using a dosage controller from MIDI-LAB. Setting of the stirring unit of the reactor: stripper: 75% power, dissolver: 50% power. The pH at the end of drop-wise addition was 6.4. The pH was adjusted to 8-9 by adding $Ca(OH)_2$. The specific surface area of the end product, measured according to BET, was 39.7 $m^2$/g. Solids content 18.6 wt %.

Production and Description of Binders that May be Used According to the Invention Binder 1

15±0.5 wt % aqueous solution of a copolymer of adipic acid with N-(2-aminoethyl)-1,2-ethanediamine and epichlorohydrin having the following characteristics:

total chlorine content: about 1.5% organic chlorine content: <0.5%

Mw>1000 g/mol

Brookfield viscosity of the aqueous solution: 80±30 mPa·s (Brookfield type EV-2+, disk spindle 3, 100 rpm; measured in a 250 mL low form glass beaker)

pH 3.0

Such products can be produced in a manner with which those skilled in the art of organic synthesis are familiar, by a two-step synthesis process. Production takes place, e.g., by producing an intermediate product consisting of the reaction product of diethylenetriamine, monoethanolamine and adipic acid. Then, in a second reaction, this intermediate is reacted with epichlorohydrin using sulfuric acid and potassium sorbate as the catalyst to form the end product; the solids content is diluted with water to 12-20 wt % and the pH is adjusted to pH 3 with more sulfuric acid. Such polymers are sold by the company Lanxess, Germany, for example, under the brand name Nadavin, e.g., Nadavin DHN (15%), or the company Mare, Italy under the brand name Maresin PD 125 (12.5%).

Preparation and Description of State-of-the-Art Mixtures

Comparative Experiment 1

Mixture of 20 Wt % Surface-Phosphated Microparticles 1 and 80 Wt % Nano Alkaline Earth Carbonate Composition 1

200 g surface-phosphated microparticles 1 (20 wt %, based on the solids content of the mixture) and 102.5 g nano alkaline earth carbonate composition 1 (80 wt %, based on the solids content of the mixture) were mixed while stirring.

Results:

A filter test was performed to illustrate the segregation tendency of the mixture and to determine the filtration rate. For this purpose, 200 mL, of a slurry with 0.5 wt % solids content of the nanoparticle/microparticle mixture was prepared and the slurry was filtered through a membrane filter with a 0.2 μm pore diameter (pressure about 25 mbar, water jet pump, room temperature). The time to filter 200 mL was measured. If segregation occurs, nano alkaline earth carbonate was the first penetrates through and into the pores (cloudy filtrate). Over time, a secondary filter cake forms on the membrane filter and blocks the pores.

Filtration Time: 3 hours 15 minutes

The filtration time shows clearly the segregation of nanoparticles and microparticles.

Comparative Experiment 2

Mixture of 20 Wt % Surface-Phosphated Microparticles 1 and 80 Wt % Nano Alkaline Earth Carbonate Composition 2

As in comparative experiment 1, while stirring, a mixture of 200 g surface-phosphated microparticles 1 and 102.5 g nano alkaline earth carbonate composition 2 was prepared.

Results:

The filtration test was performed like the filtration test in comparative experiment 1.

Filtration Time 2 hours 55 minutes

The filtration time shows clearly the segregation of nanoparticles and microparticles.

Comparative Experiment 3

Mixture of 20 Wt % Surface-Phosphated Microparticles 2 and 80 Wt % Nano Alkaline Earth Carbonate Composition 3

As in comparative experiment 1, a mixture of 100 g surface-phosphated microparticles 2 and 102.5 g nano alkaline earth carbonate composition 3 was prepared white stirring.

Results:

The filtration test was performed like the filtration test in comparative experiment 1.

Filtration Time: 2 hours 40 minutes

The filtration time shows clearly the segregation of nanoparticles and microparticles.

Comparative Experiment 4

Mixture of 10 Wt % Surface-Phosphated Microparticles 1 and 90 Wt % Nano Alkaline Earth Carbonate Composition 1

Like comparative experiment 1, a mixture of 100 g surface-phosphated microparticles 1 and 115 g nano alkaline earth carbonate composition 1 was prepared while stirring.

Results:

The filtration test was performed like the filtration test in comparative experiment 1.

Filtration Time: 2 hours 45 minutes

The filtration time shows clearly the segregation of nanoparticles and microparticles.

Preparation and Description of the Inventive Composites

Experiment 5

Composite of 19 Wt % Surface-Phosphated Microparticles 1 and 79 Wt % Nano Alkaline Earth Carbonate Composition 1 and 2 Wt % Binder 3764 g microparticles 1 (19 wt %, based on the solids content of the composite components) were placed in a 5-liter vessel, and within 5 minutes, 240 g binder 1 (2 wt %, based on the solids content of the composite components) was added by drops while stirring at 2000 rpm by means of a 5-cm-diameter toothed disk stirrer. Subsequently, 2000 g nano alkaline earth carbonate composition 1 (79 wt %, based on the solids content of the composite components) was added within another 5 minutes while stirring and then stirred intensely for 15 minutes.

Results:

A filter test was performed to test the segregation tendency of the mixture and to determine the filtration rate. For this purpose, 200 mL of a slurry with 0.5 wt % solids content of the composite was prepared and the slurry was filtered through a membrane filter with a pore diameter of 0.2 µm (pressure about 25 mbar, water jet pump; room temperature). The time to filter 200 mL was measured. If segregation occurs, nano alkaline earth carbonate first penetrates through and into the pores (cloudy filtrate). Over time, a secondary filter cake forms on the membrane filter and blocks the pores.

Filtration Time: 5 minutes

The very short filtration time shows that segregation of nanoparticles and microparticles is minor. Almost no secondary filter cake of nano alkaline earth carbonate forms on the membrane filter blocking the pores.

Figure 3:
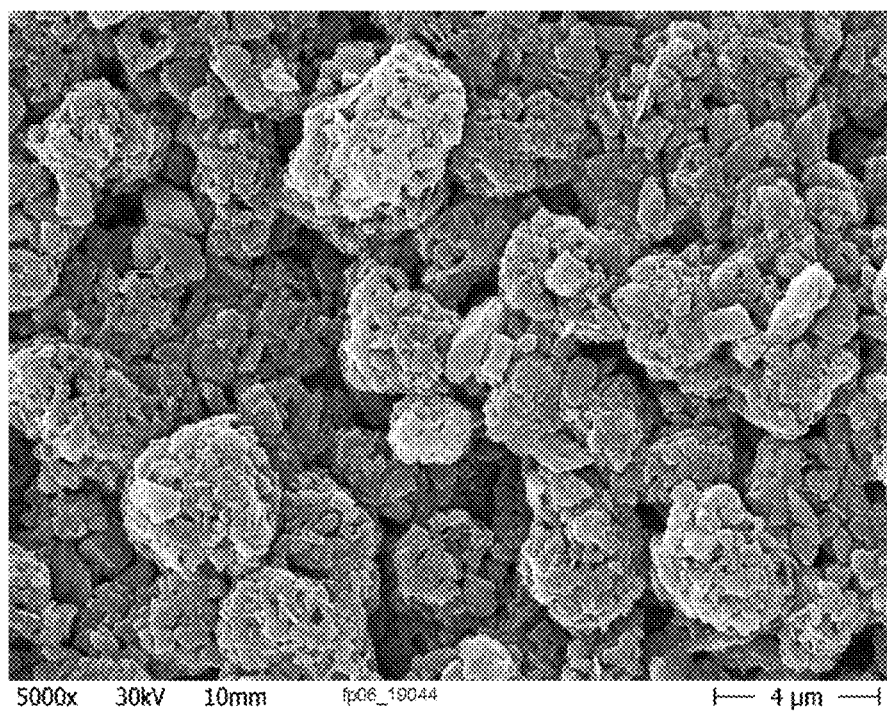
FIGS. 3 and 4 show the SEM of a preparation of an inventive composite of surface-phosphated micro pigment, nano calcium carbonate composition and binder, uncalendered (FIG. 3) and calendered (FIG. 4), respectively.
Figure 4:
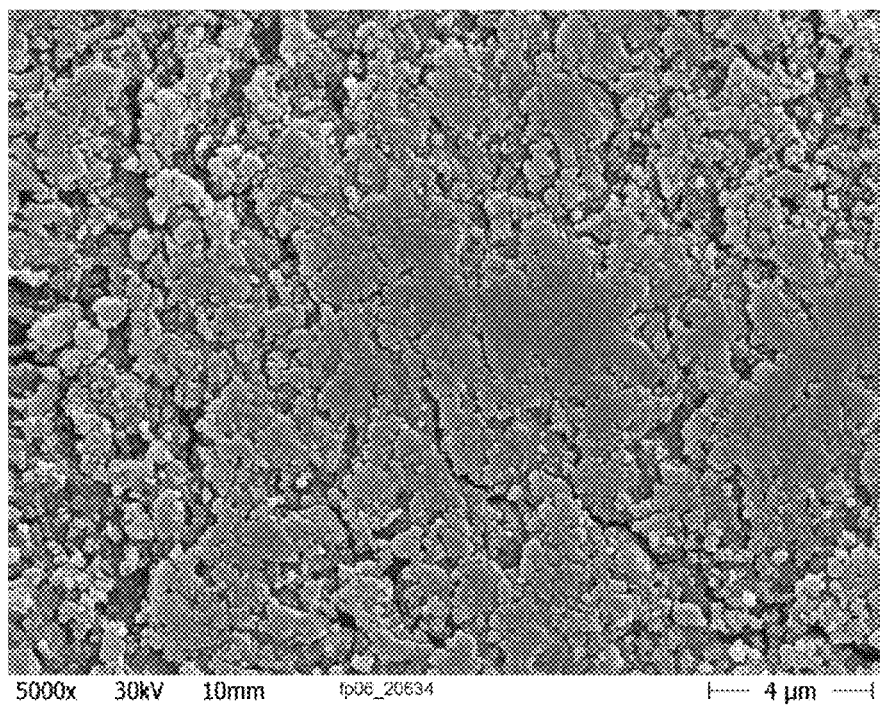

FIG. 3 shows the good coverage of the microparticles with nanoparticles, and FIG. 4 shows clearly that the composite can nevertheless be calendered very well.

Experiment 6

Composite of 9 Wt % Surface-Phosphated Microparticles 1 and 89 Wt % Nano Alkaline Earth Carbonate Composition 3 and 2 Wt % Binder 1

854 g microparticles 1 (9 wt %, based on the solids content of the composite components) were placed in a 5-liter vessel and, while stirring at 2000 rpm by means of a 5-cm-diameter toothed disk stirrer, 120 g binder 1 (2 wt %, based on the solids content of the composite components) was added by drops within 5 minutes. Subsequently, 1079 g nano alkaline earth carbonate composition 3 (89 wt %, based on the solids content of the composite components) was added within another 5 minutes while stirring and then stirred intensely for 15 minutes.

Results:

The filtration test was performed like the filtration test in experiment 5.

Filtration Time: 5 minutes

The very short filtration time shows that the segregation of nanoparticles and microparticles is minor. Almost no secondary filter cake of nano alkaline earth carbonate forms on the membrane filter blocking the pores.

Figure 5:
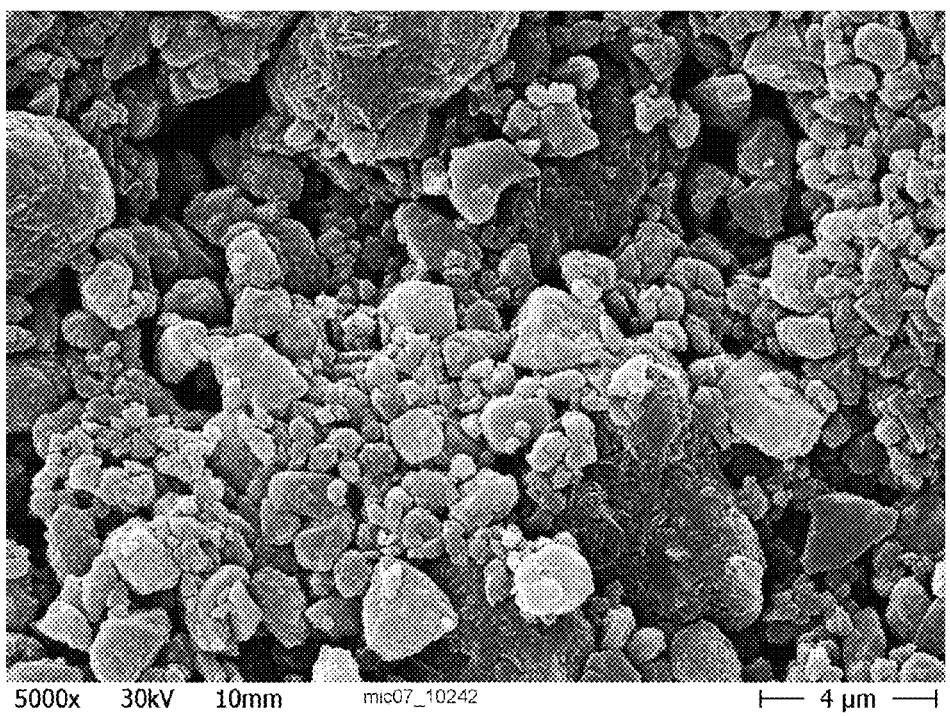
FIGS. 5 and 6 show the SEM of a preparation of an inventive composite of surface-phosphated micro pigment, nano dolomite composition and binder, uncalendered (FIG. 5) and calendered (FIG. 6), respectively.
Figure 6:
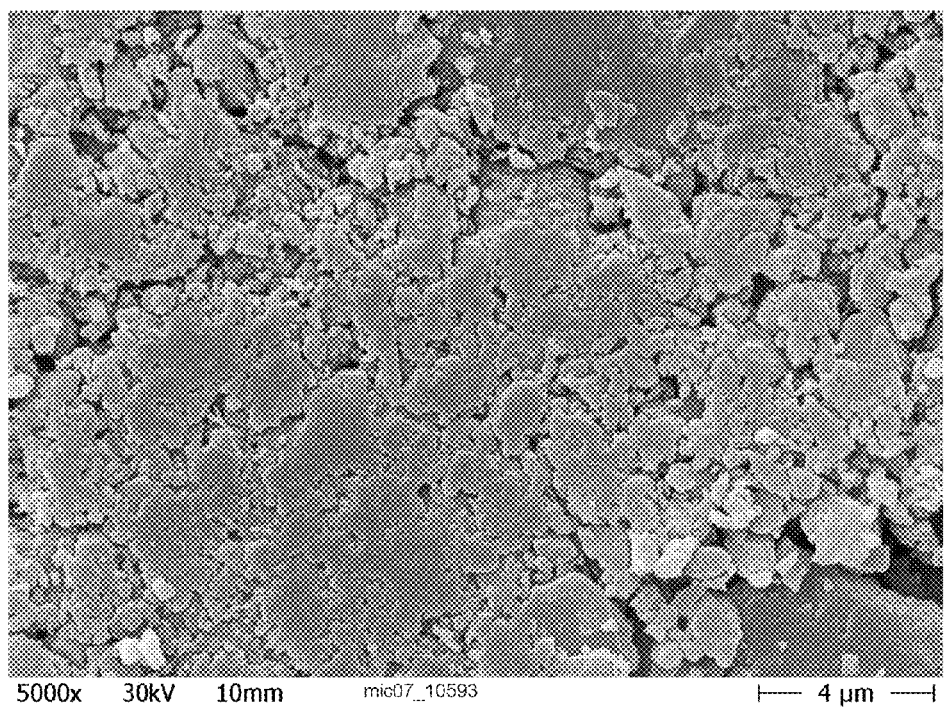

FIG. 5 shows the good coverage of the microparticles with nanoparticles and FIG. 6 shows clearly that the composite can nevertheless be calendered very well.

Experiments 7 Through 10

Composites of Surface-Phosphated Microparticles 2 and Nano Alkaline Earth Carbonate Composition 2 (in a Weight Ratio of 1:4 Based on the Solids Content of the Components) and Different Amounts of Binder 1

967.7 g microparticles 2 were placed in a 5-liter vessel and the amounts of binder 1 listed below were added by drops within 5 minutes while stirring at 2000 rpm by means of a 5-cm-diameter toothed disk stirrer. Subsequently, 1000 g nano alkaline earth carbonate composition 2 was added within another 5 minutes and stirred intensely for 15 minutes.

| Experiment | Amount of binder [Wt %] based on total solids content of microparticles and nanoparticles | [g] |
| --- | --- | --- |
| 7 | 0.5 wt % | 30 g |
| 8 | 1.0 wt % | 60 g |
| 9 | 2.0 wt % | 120 g |
| 10 | 3.0 wt % | 180 g |

Results:

1 Segregation

The filtration tests were performed like the filtration test in experiment 5.

| Filtration times: | experiment 7: | 9 minutes |
| --- | --- | --- |
| | experiment 8: | 15 minutes |
| | experiment 9: | 20 minutes |
| | experiment 10: | 23 minutes |

The very short filtration time shows that the segregation of nanoparticles and microparticles is minor. Almost no secondary filter cake of nano alkaline earth carbonate forms on the membrane filter, blocking the pores.

2. Opacity

To test the opacity of the inventive composites, the following coating colour samples were prepared:

Sample A:

90 g, based on the solids content, of the composite from experiment 10 (3 wt % binder 1) and 10 g, based on the solids content, of Acronal S 360 D were mixed while stirring.

Sample B: (Comparative Sample)

72 g carbonate nanoparticles 2, based on the solids content, were mixed with 18 g microparticles 2, based on the solids content, and 10 g Acronal S 360 D, based on the solids content, while stirring.

The resulting coating colours were applied to a Synteape plastic film (Ado Wiggins Teape) using a spiral doctor blade, resulting in the application weights being between about 5 g/m$^2$ and 30 g/m$^2$. The coated samples were dried at 60° C. to a constant weight.

The opacity values were determined by measuring the whiteness of a corresponding coated sample at the wavelength R-457 (UV) on black and the whiteness on a stack of >15 uncoated plastic films of the Synteape type. The measurement instrument used was a spectrophotometer of the Elrepho 2000 type from the Datacolor company. The average of 10 measurements was used in each case. By plotting the resulting opacity values as a function of the weight applied in an X-Y diagram, the opacity was determined at an application weight of 10 g/m$^2$, with the following result:

| Opacity at 10 g/m$^2$: | sample A: | 95.0% |
| --- | --- | --- |
| | sample B: | 94.6% |

Experiments 11 to 14

Composites of Surface-Phosphated Microparticles 2 and Nano Alkaline Earth Carbonate Composition 2 (in Various Weight Ratios, Based on the Solids Content of the Components) and 2 Wt % (Based on the Total Solids Content of the Microparticles and Nanoparticles) Binder 1

The amounts of microparticles 2 listed below were placed in a 5-liter vessel, and within 5 minutes 120 g binder 1 was added by drops while stirring at 2000 rpm by means of a 5-cm-diameter toothed disk stirrer. Then the amount of nano alkaline earth carbonate composition 2 listed below was added within another 5 minutes while stirring and was stirred intensely for 15 minutes.

| Experiment | Amount of micro-/nanoparticles | |
|---|---|---|
| | [Wt %] based on total solids content of micro- and nanoparticles | [g] |
| 11 | 10/90 | 484 g/1125 g |
| 12 | 20/80 | 968 g/1000 g |
| 13 | 30/70 | 1452 g/875 g |
| 14 | 50/50 | 2419 g/625 g |

Results:
1. Segregation

The filtration tests were performed like the filtration test in experiment 5.

| Filtration times: | experiment 11: | 45 minutes |
|---|---|---|
| | experiment 12: | 20 minutes |
| | experiment 13: | 7 minutes |
| | experiment 14: | 3 minutes |

The very short filtration time shows that the segregation of nanoparticles and microparticles is minor. Almost no secondary filter cake of nano alkaline earth carbonate forms on the membrane filter, blocking the pores.

2. Opacity

To investigate the opacity of the inventive composites, the composites of experiments 11 to 14 were processed like experiment 10 (sample A) to form a coating colour, then applied to a Synteape type of plastic film and the opacity of the coated film was tested at an application weight of 10 g/m² and 20 g/m².

The results were as follows:

| Experiment | Opacity (%) at | |
|---|---|---|
| | 10 g/m² | 20 g/m² |
| 11 | 93.6 | 94.8 |
| 12 | 94.2 | 95.7 |
| 13 | 94.8 | 96.4 |
| 14 | 95.0 | 96.8 |

Experiment 15

Composite of 19.5 Wt % Surface-Phosphated Microparticles 1 and 78.5 Wt % Nano Alkaline Earth Carbonate Composition 2 and 2 Wt % Binder 1

1143 kg of the nano alkaline earth carbonate composition 2 (78.5 wt %, based on the solids content of the composite components) was placed first in a 5 m³ container having a stirrer and mixed with 11.25 kg 10 wt % NaOH and 19.7 kg 40 wt % commercial sodium polyacrylic (Mw: 12000 g/mol) as the dispersant. After a mixing time of 5 minutes, 2222 kg surface-phosphated microparticles 1 (19.5 wt %, based on the solids content of the composite components) which had been pretreated with 2 wt % (based on the solids content of the composite components) of the inventive binder 1 were added within about 35 minutes while stirring. In the course of the experiment, the viscosity increased sharply, but miscibility was always ensured. The power consumption by the stirrer was 24 kW. A 1-liter sample was taken. The viscosity was 3200 mPa·s, the pH was 8.33, the solids content was 48.92 wt %, the temperature was 35° C. By adding another 5.625 kg 10 wt % NaOH, the viscosity dropped to 2400 mPa·s. The pH was then 8.81.

Then another 28.12 kg commercial sodium polyacrylate (Mw: 12000 g/mol) were added to this slurry, and after mixing for 2 hours, the viscosity was about 700 mPa·s at a pH of 8.8. The power consumption by the stirrer was reduced to 10.5 kW. The solids content of the end product was 48.87%.

Results:

Absorption:

The following experiments were conducted to investigate the absorption of the inventive composites:

Tablet Preparation

First, tablets of the composite of experiment 15 were pressed and, for comparison, of the surface-phosphated microparticles 1 and the nano alkaline earth carbonate composition 2.

The tablets were formed by exerting a constant pressure (15 bar) on the suspension/slurry until the water was released by filtration through a fine 0.025 µm filter membrane, which led to a compacted tablet. The time required for this was 2 minutes for the microparticle tablet (the extremely short time is proof of the very high permeability of the sample); for the composite of experiment 15, it was about 1 hour and for the nanoparticle tablet it was about 2 hours.

Tablets with a diameter of about 4 cm and a thickness of 1.5-2.0 cm were prepared by this method, which could be divided and shaped into suitable sample configurations for further analysis. The method and the device used for this are described in C. J. Ridgway, P. A. C. Gane, J. Schoelkopf (2004): "Modified Calcium Carbonate Coatings with Rapid Absorption and Extensive Liquid Uptake Capacity," *Colloids and Surfaces A: Physicochem And Eng. Asp.*, vol. 236, (1-3), pp. 91-102.

The tablets were removed from the device and dried in an oven at 80° C. for 24 hours.

The tablets were then divided, one part of each tablet being tested by means of a mercury porosimeter and two parts being used for liquid absorption measurements.

Porosimetry

One part of each tablet was tested for its porosity as well as its pore size by means of mercury porosimetry using a Micromeritics Autopore IV mercury porosimeter. The maximum mercury pressure used was 414 MPa, which is equivalent to a Laplace capillary neck diameter of 0.004 µm.

Figure 7:
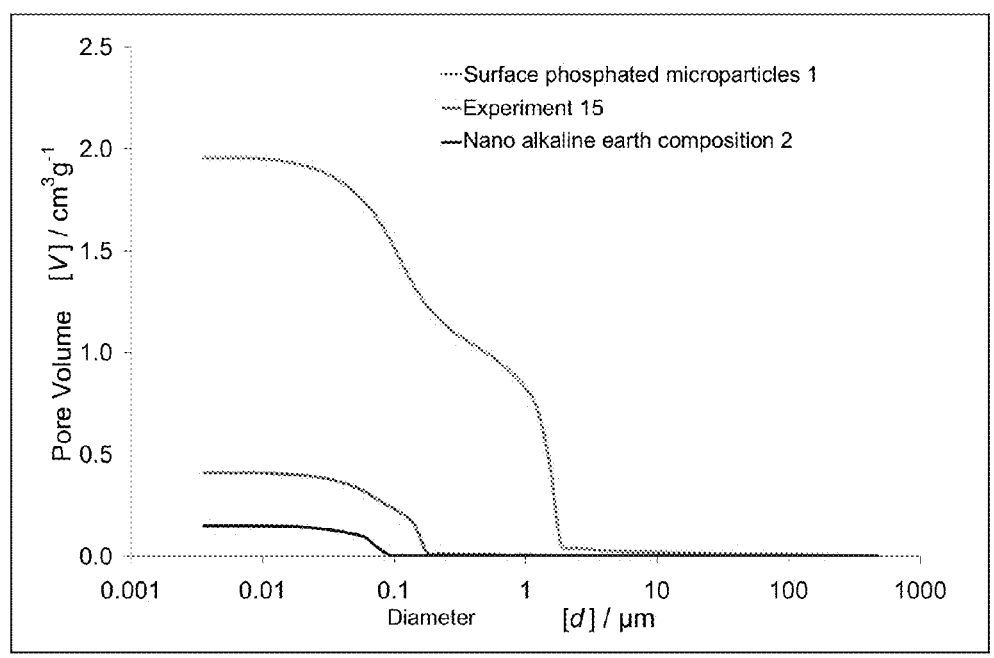
FIG. 7 shows the mercury intrusion curves of various tablet samples.

FIG. 7 shows the mercury intrusion curves for the three different tablet samples. The data were corrected with regard to the mercury compression, the penetrometer effects and with regard to the sample compression using the Pore-Comp software (obtainable from Environmental and Fluid Modelling Group, Plymouth, UX) (cf. P. A. C. Cane, J. P. Kettle, G. P. Matthews, C. J. Ridgway (1996): "Void Space Structure of Compressible Polymer Spheres and Consolidated Calcium Carbonate Paper-Coating Formulations," *Industrial and Engineering Chemistry Research*, 35 (5), p. 1753).

The sample of microparticles 1 definitely has the highest pore volume. The porosity values and the volume intrusion into the samples are summarized in the following table:

| Sample | Porosity [%] | Total intrusion volume [cm³g⁻¹] |
|---|---|---|
| Microparticles 1 | 83.6 | 1.94 |
| Experiment 15 | 52.7 | 0.41 |
| Nanoparticles 2 | 28.6 | 0.15 |

Figure 8:
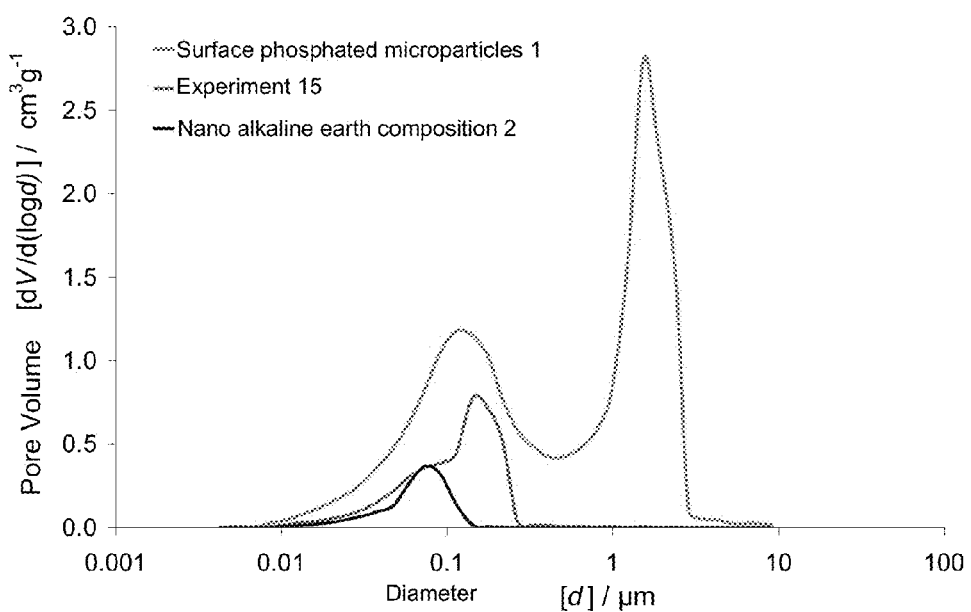
FIG. 8 shows the pore size distribution of various tablet samples.

If one considers the first derivation of the cumulative intrusion curve, it is apparent on the basis of the pore size distribution, based on the equivalent Laplace diameters, that evidently there is a shielding of the pores. This is illustrated in FIG. 8.

The tablet of microparticles 1 has a bimodal pore size distribution with larger pores between the particles and smaller pores within the particles. The larger peak at the right in the diagram for the larger diameter of 1.5 µm together with the much broader peak for the smaller pore sizes of 0.11 µm corresponds to the high intrusion volume depicted in FIG. 7.

The sample from experiment 15 has a main peak at 0.14 µm. To the left of this maximum there is a plateau which suggests a low pore volume due to pores less than 0.1 µm. These distributions are below the peak for small pores of the microparticle 1 tablet sample.

The nanoparticle 2 sample has a peak at the same pore diameters as the plateau at the left of the curve for the sample of experiment 15 and is below this curve. There is also a plateau at the left of this peak, indicating the presence of smaller pores, but the nanoparticle 2 sample has the lowest curve in this area and thus the least contribution of these small pores in the volume.

It can be derived from the pore size distribution that the highest distribution of the product from experiment 15 is exactly at the correct location for optimal light reflection (about 0.10-0.2 µm).

The microparticles 1 also have many pores in this area, but they also have a large pore volume range which is lost due to the "wrong" pore size. These data explain why the sample of experiment 15 has the potential for a higher opacity.

Liquid Absorption

The accessible pore volume of the tablet structures can be measured by liquid absorption, e.g., of hexadecane, which is known for being able to fill up the entire pore volume of a porous pigment structure accessible to saturation (cf. P. A. C. Gane, J. Schoelkopf, D. C. Spielmann, G. P. Matthews, C. J. Ridgway (2000): "Fluid Transport Into Porous Coating Structures: Some Novel Findings," *Tappi Journal*, 83 (5), p. 77).

Using a rotating flat disk mill and a specially designed, precisely adjustable chucking device, regular blocks with a cross section of 12×12 mm² were cut from tablet pieces and were ground. To prevent artifacts due to wetting of their outside surface, the samples were provided with a thin protective silicone layer around the base of the vertical edges extending from the base surface. The other outside surfaces were not coated to allow displaced air to escape during the absorption of liquid and to minimize any interactions between the silicone and the absorbed liquid.

The device used to measure the liquid absorption is described in detail by P. A. C. Gane, J. Schoelkopf, D. C. Spielmann, G. P. Matthews, C. J. Ridgway (2000): "Fluid Transport Into Porous Coating Structures: Some Novel Findings", *Tappi Journal*, 83 (5), p. 77.

As soon as the sample is lowered to bring it in contact with the liquid to be absorbed, the weight loss of the weighing plate with the liquid supply is recorded continuously using an automatic microbalance, namely a Mettler Toledo AT460 scale with an accuracy of 0.1 mg, which was connected to a PC and made it possible to perform 10 measurements per second. As soon as the recorded weight is constant, which indicates absorption saturation, the measurement is complete. Based on the knowledge of the weight at the beginning and end of the absorption measurement, the intrusion volume per gram of sample can be calculated (dividing the weight difference by the density of the liquid yields the volume that has penetrated into the sample and thus the volume per gram of sample).

As explained above, the absorption curves during the absorption of liquid may be expressed as a linear ratio between $V(t)/A$ and $\sqrt{t}$ with the following gradient:

$$\frac{d(V(t)/A)}{d\sqrt{t}} = \frac{d((m(t)/\rho)/A)}{d\sqrt{t}}$$

wherein $m(t)$ is the weight uptake at time t defined by a volume $V(t)$ of a liquid with the density $\rho$. These data are standardized to the cross-sectional area A of the sample so that the data can be expressed as $V(t)/A$, the volume absorbed per unit of cross-sectional area of the sample. The gradient can be obtained directly by linear regression from the data printed out, yielding the absorption rate of the liquid uptake.

Figure 9:
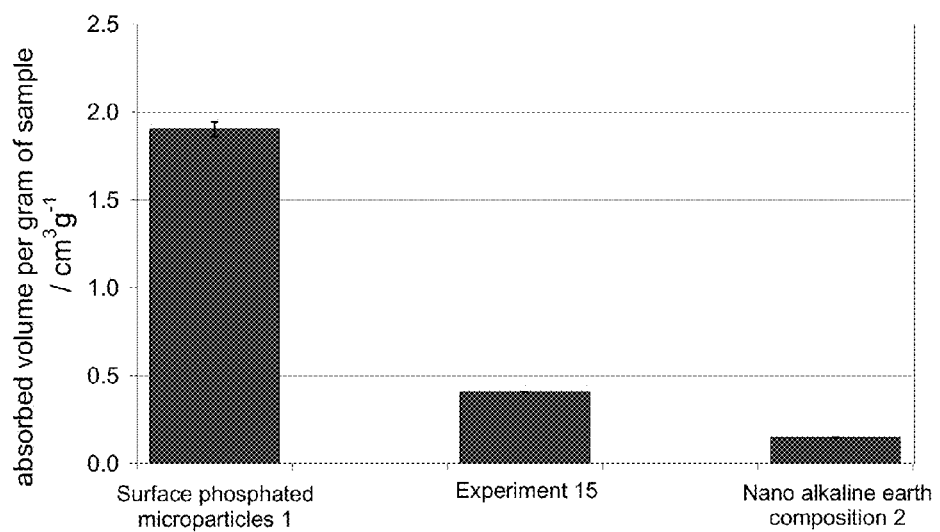
FIG. 9 shows the total volume absorbed per sample weight of various samples.

FIG. 9 shows the total saturation volume per sample weight using hexadecane as the absorbed liquid; these data are the averages of the measurements of two blocks from the same tablet of each sample.

The microparticle 1 sample definitely has a higher pore volume, as already found in the porosity measurement. The sample of experiment 15 has lower values and the sample of nanoparticles 2 has the lowest absorbed total volume. These values correspond to the total intrusion volumes measured during the porosity tests.

Figure 10:
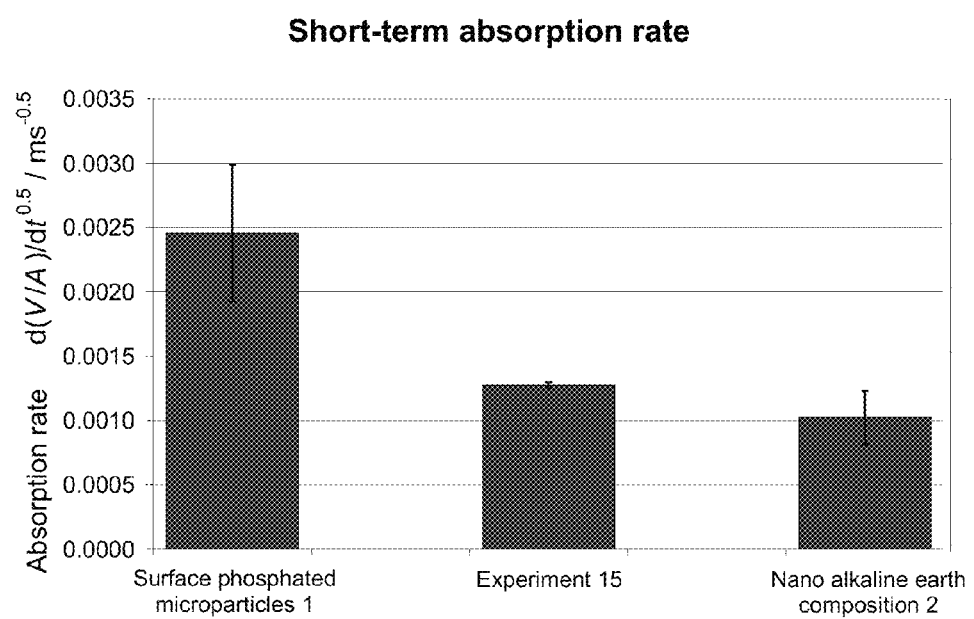
FIG. 10 shows the absorption rate of hexadecane in various samples over a short period of time.
Figure 11:
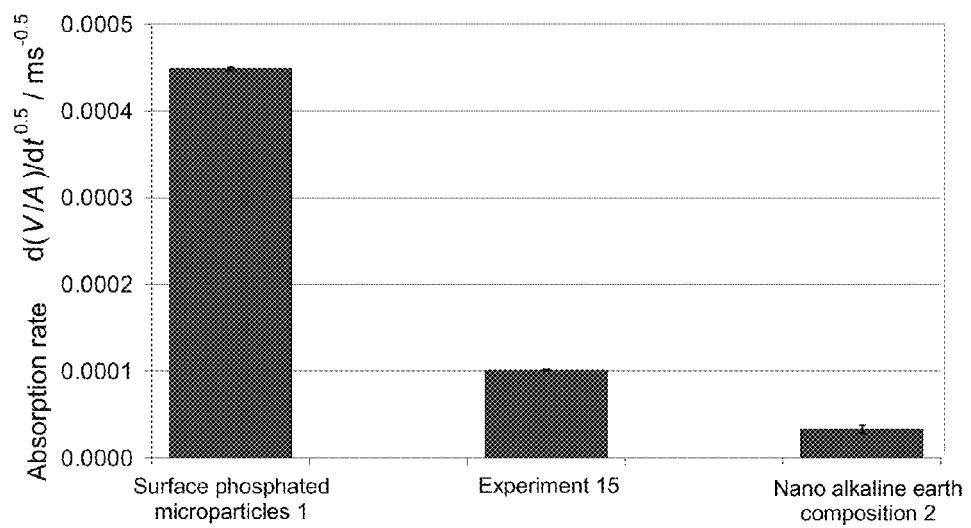
FIG. 11 shows the absorption rate of hexadecane in various samples over a long period of time.

FIGS. 10 and 11 show the absorption rates of the hexadecane uptake into the sample blocks, calculated as the linear gradient of the volume uptake per unit of cross-sectional area plotted as a function of the square root of time. Again, each value is an average of two blocks from the same tablet of each sample. This property depends not only on the capillarity but also on the permeability. FIG. 10 shows the results for the measurements over a short period of time; FIG. 11 shows the results for the measurements over a long period of time.

The respective periods of time until reaching the corresponding absorption rate are given in the following table:

|  | Time (short-term absorption rate) [s] | Time (long-term absorption rate) [s] |
|---|---|---|
| Microparticles 1 | 1.0 | 900 |
| Nanoparticles 2 | 1.3 | 25,600 |
| Experiment 15 | 1.45 | 9000 |

Measurements over a short period of time show that the microparticles 1 have a faster absorption rate. The larger pores between the particles allow the liquid to use the smaller pores within the particles which have an optimal absorption diameter, i.e., less than 0.1 µm. The two other samples have comparable slower initial uptake rates.

As soon as a long-term equilibrium has been established, the uptake rates become slower by one order of magnitude. The microparticle 1 samples still have a more rapid uptake but now more definite differences are discernible between the other samples. The tablets of experiment 15 have higher liquid uptake rates than nanoparticles 2, because of the larger number of small pores below 0.1 µm. The sample of experiment 15 has a much lower absorption in comparison with microparticles 1. The nanoparticle sample now has the lowest absorption rate over a longer period of time.

Experiment 16

Composite Coating Colour of Surface-Phosphated Microparticles 1 and Nano Alkaline Earth Carbonate Composition 1 and 2 Wt % Binder 1 and Latex 970 g microparticles 1 (11 wt %, based on the solids content of the composite components) were placed in a 5-liter vessel and 120 g binder 1 (2 wt %, based on the solids content of the composite components) was added by drops within 5 minutes while stirring at 2000 rpm by means of a 5-cm-diameter toothed disk stirrer. Subsequently, 1000 g nano alkaline earth carbonate composition 1 (87 wt %, based on the solids content of the composite components) were added while stirring within another 5 minutes and stirred intensely for 15 minutes.

Results:
Opacity:

While stirring, 12 wt % Acronal S 360 D Latex (BASF), based on the total solids content of the composite, was added to the resulting composite slurry, yielding a 43 wt % (±1 wt %) coating colour.

The opacity was determined according to experiment 10, amounting to:

| | Opacity (%) at | |
| --- | --- | --- |
| | 10 g/m$^2$ | 20 g/m$^2$ |
| Experiment 16 | 95.4 | 96.7 |

It is clearly discernible from the measured values that the composite coating colour creates a very good opacity.

Experiment 17

Charge Neutralization of Binder 1

To determine the solids content of binder 1, about 0.8-1 g was weighed accurately to 1 mg and dried for 1 hour at 150° C. in a circulating air-drying cabinet. Then the solids content of a sodium polyacrylate with Mw 25000-28000 g/mol such as that also used to produce the nano alkaline earth carbonate composition 3, was determined in the same way, and then a 1 wt % aqueous test solution was prepared.

1 g, based on the solids content of binder 1, was diluted with water to 1 wt % and titrated with 1 wt % sodium polyacrylate test solution using the Mütek PCD 02 particle charge detector (BTG Instruments GmbH, 82211 Herrsching) until the charge was neutralized.

Result:
To achieve a charge-based neutralization of 100 g binder 1, 10.36 g of a 42.8 wt % sodium polyacrylate solution with Mw 25000-28000 is needed. Based on the solids, 29.2 g 100 wt % sodium polyacrylate with an Mw of 25000-28000 g/mol was necessary for charge neutralization of 100 g of 100 wt % binder 1.

The invention claimed is:

1. Surface-phosphated inorganic pigment and/or filler microparticles having a spherical equivalent diameter of 0.3 μm to 100 μm as determined by the sedimentation method, wherein the surface-phosphated inorganic pigment and/or filler microparticles comprise natural ground calcium carbonate, precipitated calcium carbonate, dolomite, or any mixture thereof, surface-phosphated by treatment with phosphoric acid, and wherein the surface-phosphated inorganic pigment and/or filler microparticles are at least partially coated with (i) a copolymer comprising one or more dicarboxylic acids, one or more diamines, triamines, dialkanolamines or trialkanolamines, and epichlorohydrin; and (ii) a composition comprising alkaline earth carbonate particles in which ≥90% of the particles, based on the number N of the particles, have a spherical equivalent diameter of less than 200 nm as determined by the sedimentation method.

2. The surface-phosphated inorganic pigment and/or filler microparticles according to claim 1, wherein the copolymer comprises adipic acid, N-(2-aminoethyl)-1,2-ethanediamine and epichlorohydrin.

3. The surface-phosphated inorganic pigment and/or filler microparticles according to claim 1, wherein the alkaline earth carbonate particles comprise natural ground calcium carbonate, precipitated calcium carbonate, a mixed carbonate, dolomite, or any mixture thereof.

4. The surface-phosphated inorganic pigment and/or filler microparticles according to claim 1, wherein the inorganic pigment and/or filler microparticles comprise natural ground calcium carbonate selected from marble, limestone, chalk or any mixture thereof.

5. The surface-phosphated inorganic pigment and/or filler microparticles according to claim 1, wherein the inorganic pigment and/or filler microparticles comprise precipitated calcium carbonate having a vateritic, calcitic or aragonitic crystal structure.

6. The surface-phosphated inorganic pigment and/or filler microparticles according to claim 1, wherein the phosphated surface of the inorganic pigment and/or filler microparticles comprise calcium phosphate selected from calcium hydrogen phosphate, octacalcium phosphate (OCP), hydroxyapatite (HAP) or any mixture thereof.

7. The surface-phosphated inorganic pigment and/or filler microparticles according to claim 1, wherein the phosphated surface of the inorganic pigment and/or filler microparticles is phosphated by treatment with phosphoric acid and one or more further medium-strong to strong $H_3O^+$ ion providers and gaseous carbon dioxide.

8. The surface-phosphated inorganic pigment and/or filler microparticles according to claim 1, wherein the one or more dicarboxylic acids of the binder is selected from the group consisting of saturated or unsaturated, branched or unbranched $C_2$-$C_{10}$ dicarboxylic acids, $C_3$-$C_9$ dicarboxylic acids, $C_4$-$C_8$ dicarboxylic acids, $C_5$-$C_7$ dicarboxylic acids and adipic acid.

9. The surface-phosphated inorganic pigment and/or filler microparticles according to claim 1, wherein the one or more diamines, triamines, dialkanolamines or trialkanolamines of the binder is selected from the group consisting of linear and branched, substituted and unsubstituted diamines, triamines and di- and trialkanolamines, N-(2-aminoethyl)-1,2-ethanediamine, diethanolamine, N-alkyldialkanolamines, N-methyl-diethanolamine, N-ethyldiethanolamine and triethanolamine.

* * * * *